(12) United States Patent
Nozaki et al.

(10) Patent No.: US 11,851,301 B2
(45) Date of Patent: Dec. 26, 2023

(54) SHEET PROCESSING APPARATUS, IMAGE FORMING APPARATUS, AND IMAGE FORMING SYSTEM

(71) Applicants: Wataru Nozaki, Kanagawa (JP); Tomohiro Furuhashi, Kanagawa (JP); Yoshito Suzuki, Chiba (JP); Wataru Takahashi, Tokyo (JP); Shinya Monma, Kanagawa (JP); Joji Akiyama, Kanagawa (JP); Yohsuke Haraguchi, Kanagawa (JP); Sho Asano, Kanagawa (JP)

(72) Inventors: Wataru Nozaki, Kanagawa (JP); Tomohiro Furuhashi, Kanagawa (JP); Yoshito Suzuki, Chiba (JP); Wataru Takahashi, Tokyo (JP); Shinya Monma, Kanagawa (JP); Joji Akiyama, Kanagawa (JP); Yohsuke Haraguchi, Kanagawa (JP); Sho Asano, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 0 days.

(21) Appl. No.: 17/826,718

(22) Filed: May 27, 2022

(65) Prior Publication Data
US 2022/0380166 A1 Dec. 1, 2022

(30) Foreign Application Priority Data
Jun. 1, 2021 (JP) .................................. 2021-092233

(51) Int. Cl.
*B65H 39/06* (2006.01)
*B32B 37/10* (2006.01)
(Continued)

(52) U.S. Cl.
CPC ......... *B65H 39/06* (2013.01); *B32B 37/1027* (2013.01); *B32B 38/004* (2013.01);
(Continued)

(58) Field of Classification Search
CPC ............ B65H 2801/27; B65H 2553/27; B65H 2301/43822; B65H 43/00; B32B 37/10; B32B 37/1027; B32B 38/004
(Continued)

(56) References Cited

U.S. PATENT DOCUMENTS 5,217,561 A * 6/1993 Ueda .................... B32B 38/0036
219/508
5,306,381 A * 4/1994 Nakazawa .............. B32B 38/14
219/508
(Continued)

FOREIGN PATENT DOCUMENTS

| JP | 6-011980 | 1/1994 |
| JP | 9-164593 | 6/1997 |
| JP | 2015-025908 | 2/2015 |

*Primary Examiner* — Leslie A Nicholson, III
(74) *Attorney, Agent, or Firm* — Harness, Dickey & Pierce, P.L.C.

(57) ABSTRACT

A sheet processing apparatus laminates a partially joined two-ply sheet and a sheet medium inserted in the two-ply sheet. The sheet processing apparatus includes a heat presser, an information acquisition device, and control circuitry. The heat presser heats and presses the two-ply sheet and the sheet medium. The information acquisition device acquires information on the two-ply sheet and the sheet medium. The control circuitry sets a fixing temperature of the heat presser in accordance with the information of the two-ply sheet and the sheet medium acquired by the information acquisition device.

10 Claims, 21 Drawing Sheets

(51) Int. Cl.
 B32B 38/00 (2006.01)
 B65H 43/00 (2006.01)

(52) U.S. Cl.
 CPC ... B65H 43/00 (2013.01); *B65H 2301/43822* (2013.01); *B65H 2553/27* (2013.01); *B65H 2801/03* (2013.01)

(58) Field of Classification Search
 USPC .......... 270/58.07, 58.08, 58.09; 53/463, 477, 53/329.2
 See application file for complete search history.

(56) References Cited

U.S. PATENT DOCUMENTS

| | | | | |
|---|---|---|---|---|
| 6,159,327 A * | 12/2000 | Forkert | ................. | B26D 1/305 156/364 |
| 6,893,521 B2 * | 5/2005 | Sasaki | ................. | B32B 37/185 156/367 |
| 10,338,510 B2 * | 7/2019 | Takahashi | ........... | G03G 15/2028 |
| 11,099,507 B2 * | 8/2021 | Watanabe | .......... | G03G 15/2028 |
| 11,261,043 B2 * | 3/2022 | Suzuki | ................. | B32B 37/142 |
| 11,273,629 B2 * | 3/2022 | Takahashi | ................ | B65H 3/66 |
| 11,292,240 B2 * | 4/2022 | Akiyama | ................ | B65H 5/305 |
| 11,500,323 B2 * | 11/2022 | Takahashi | .............. | B65H 5/305 |
| 11,584,606 B2 * | 2/2023 | Haraguchi | ................ | B65H 3/32 |
| 2015/0031520 A1 | 1/2015 | Nakada et al. | | |
| 2016/0340145 A1 * | 11/2016 | Kunieda | ................... | B42B 4/00 |
| 2019/0284012 A1 | 9/2019 | Yoneyama et al. | | |
| 2020/0338877 A1 * | 10/2020 | Takahashi | ............ | B65H 3/0638 |
| 2020/0341414 A1 | 10/2020 | Watanabe et al. | | |
| 2020/0407187 A1 | 12/2020 | Hidaka et al. | | |
| 2021/0039900 A1 | 2/2021 | Shimazu et al. | | |
| 2021/0039916 A1 | 2/2021 | Sugiyama et al. | | |
| 2021/0253385 A1 | 8/2021 | Yoshito et al. | | |
| 2021/0289090 A1 | 9/2021 | Monma et al. | | |
| 2021/0294249 A1 | 9/2021 | Takahashi et al. | | |
| 2021/0325804 A1 | 10/2021 | Furuhashi et al. | | |
| 2021/0333730 A1 | 10/2021 | Asano et al. | | |
| 2021/0347160 A1 | 11/2021 | Akiyama et al. | | |
| 2021/0347589 A1 | 11/2021 | Suzuki et al. | | |
| 2021/0354948 A1 | 11/2021 | Takahashi et al. | | |
| 2021/0356899 A1 | 11/2021 | Takahashi et al. | | |
| 2021/0387467 A1 | 12/2021 | Asano et al. | | |
| 2021/0403273 A1 | 12/2021 | Haraguchi et al. | | |
| 2021/0405571 A1 | 12/2021 | Nozaki et al. | | |
| 2022/0011712 A1 | 1/2022 | Asano et al. | | |

\* cited by examiner

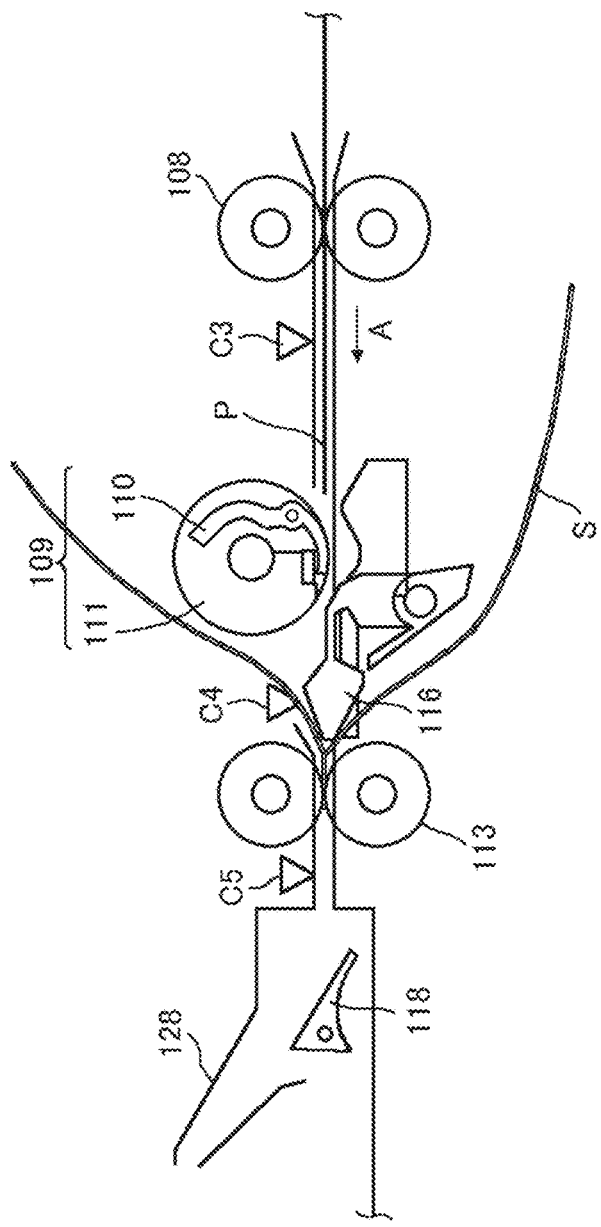
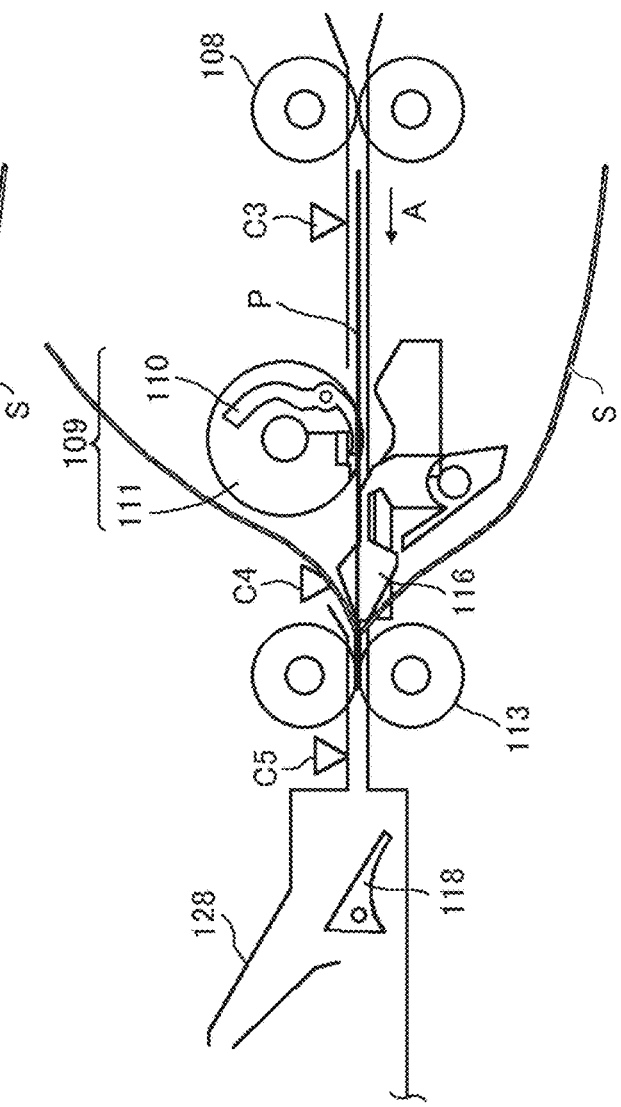
FIG. 10
FIG. 11

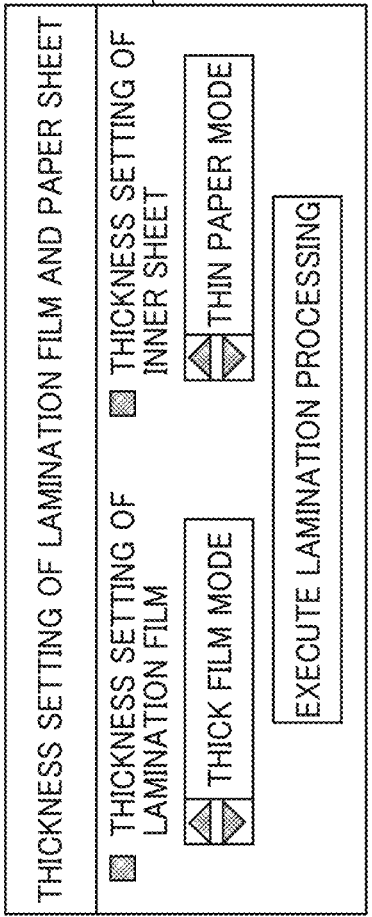

| FIXING TEMPERATURE (°C) | | THICKNESS SETTING OF INNER SHEET | | |
|---|---|---|---|---|
| | | THIN PAPER MODE (50 g/m² TO 64 g/m²) | NORMAL PAPER MODE (64 g/m² TO 80 g/m²) | THICK PAPER MODE (80 g/m² TO 105 g/m²) |
| THICKNESS SETTING OF LAMINATION FILM | THIN FILM MODE (60 μm TO 90 μm) | LOW-TEMPERATURE FIXING 1 (110°C TO 120°C) | LOW-TEMPERATURE FIXING 2 (115°C TO 125°C) | LOW-TEMPERATURE FIXING 3 (120°C TO 130°C) |
| | NORMAL FILM MODE (90 μm TO 120 μm) | MIDDLE-TEMPERATURE FIXING 1 (125°C TO 135°C) | MIDDLE-TEMPERATURE FIXING 2 (130°C TO 140°C) | MIDDLE-TEMPERATURE FIXING 3 (135°C TO 145°C) |
| | THICK FILM MODE (120 μm TO 150 μm) | HIGH-TEMPERATURE FIXING 1 (140°C TO 150°C) | HIGH-TEMPERATURE FIXING 2 (145°C TO 155°C) | HIGH-TEMPERATURE FIXING 3 (150°C TO 160°C) |

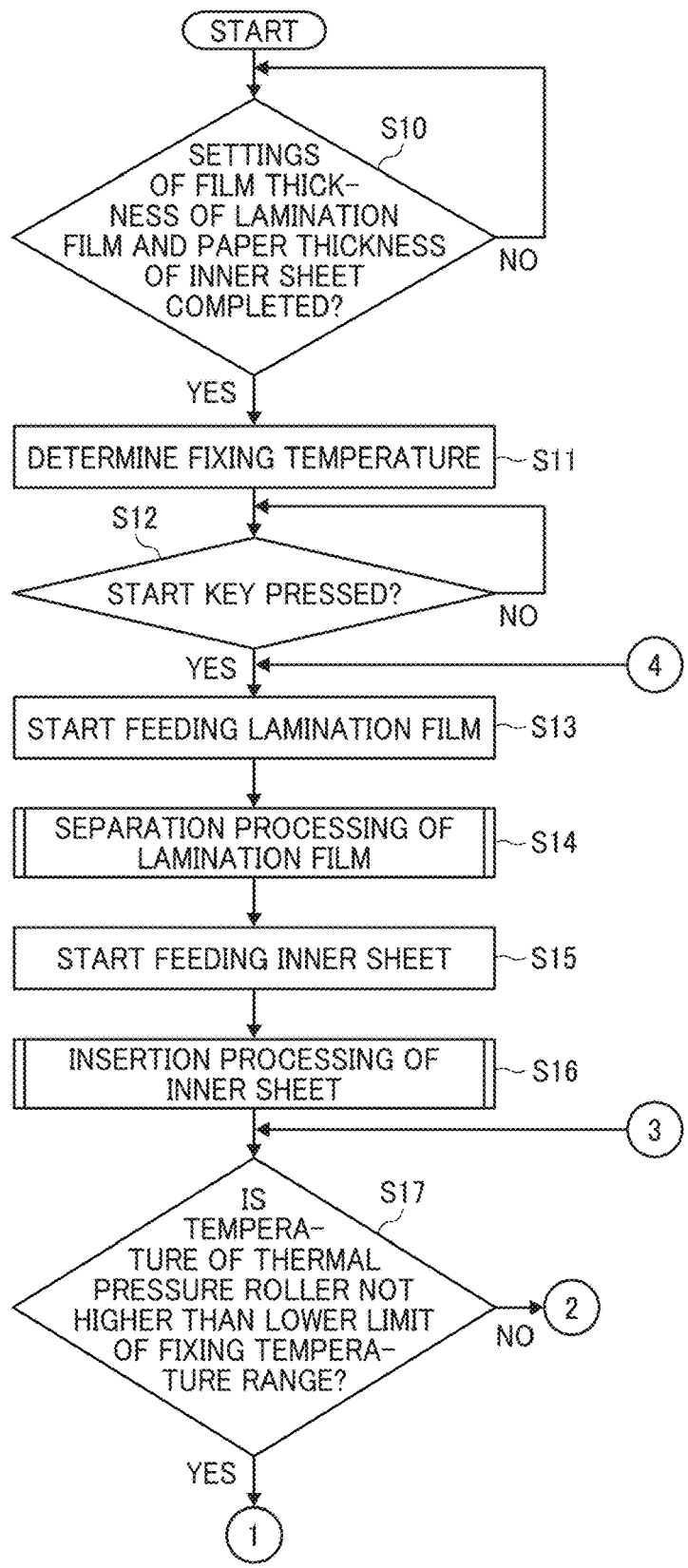

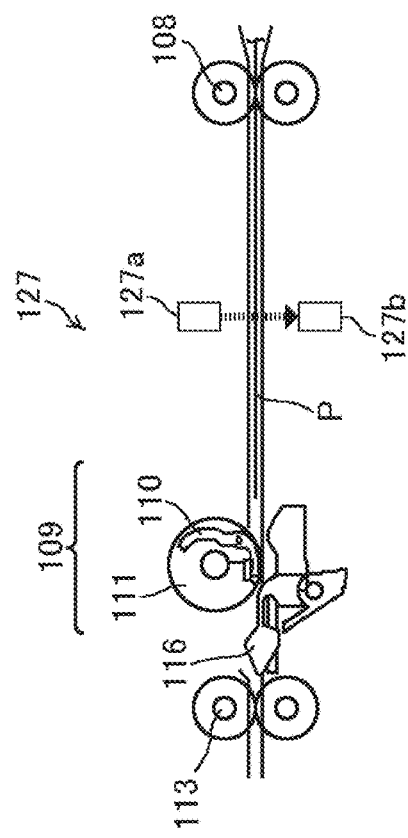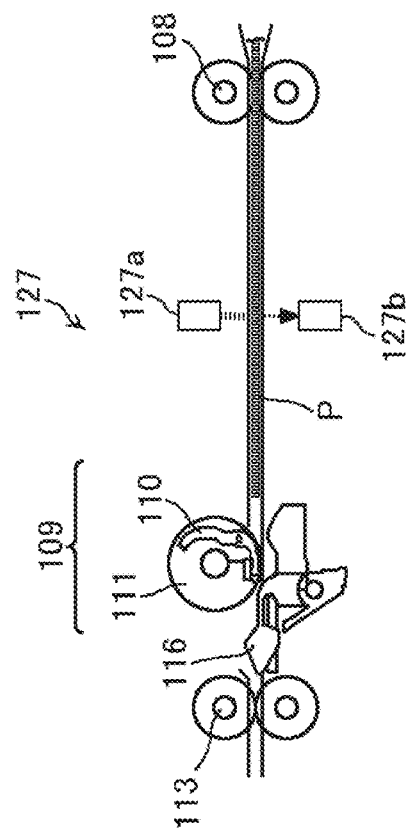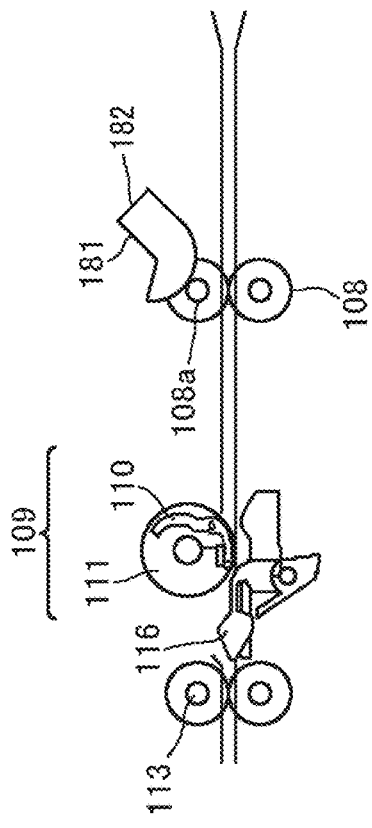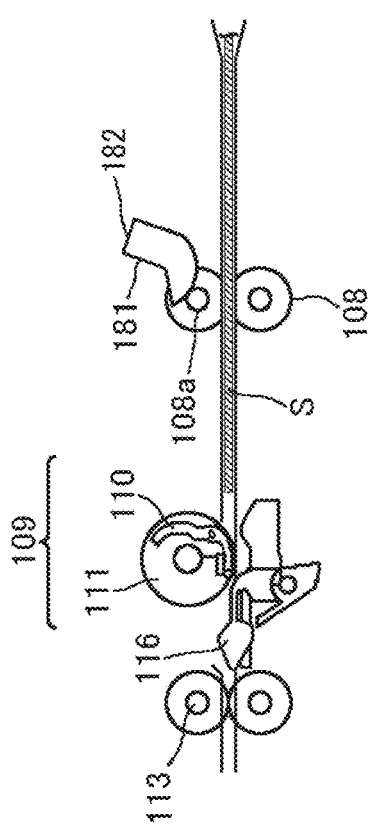

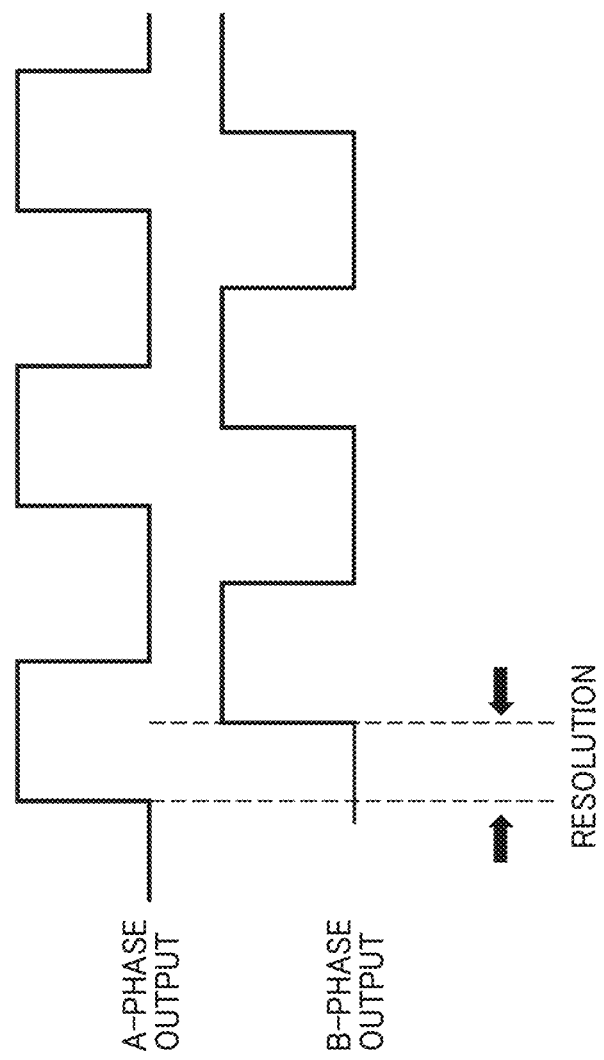

SHEET PROCESSING APPARATUS, IMAGE FORMING APPARATUS, AND IMAGE FORMING SYSTEM

CROSS-REFERENCE TO RELATED APPLICATION

This patent application is based on and claims priority pursuant to 35 U.S.C. § 119(a) to Japanese Patent Application No. 2021-092233, filed on Jun. 1, 2021, in the Japan Patent Office, the entire disclosure of which is hereby incorporated by reference herein.

BACKGROUND

Technical Field

Embodiments of the present disclosure relate to a sheet processing apparatus, an image forming apparatus, and an image forming system.

Related Art

A technique called lamination processing is known in which an inner sheet (e.g., a paper sheet or photograph) is inserted into a two-ply sheet (e.g., a lamination film) whose one side is joined (connected), and heat and pressure are applied to bond the two-ply sheet.

For example, there is known a technique for determining a fixing temperature based on information of the thickness of an inner sheet in order to laminate a processing object in which the inner sheet is inserted between two lamination films.

SUMMARY

According to an embodiment of the present disclosure, a sheet processing apparatus laminates a partially joined two-ply sheet and a sheet medium inserted in the two-ply sheet. The sheet processing apparatus includes a heat presser, an information acquisition device, and control circuitry. The heat presser heats and presses the two-ply sheet and the sheet medium. The information acquisition device acquires information on the two-ply sheet and the sheet medium. The control circuitry sets a fixing temperature of the heat presser in accordance with the information of the two-ply sheet and the sheet medium acquired by the information acquisition device.

According to another embodiment of the present disclosure, an image forming apparatus includes the sheet processing apparatus and an image forming device to form an image.

According to still another embodiment of the present disclosure, an image forming system includes the sheet processing apparatus.

BRIEF DESCRIPTION OF THE DRAWINGS

A more complete appreciation of the embodiments and many of the attendant advantages and features thereof can be readily obtained and understood from the following detailed description with reference to the accompanying drawings, wherein:

FIG. 10 is a schematic view of the main part of the sheet processing apparatus in a lamination processing mode;

FIG. 11 is a schematic view of the main part of the sheet processing apparatus, subsequent to the state illustrated in FIG. 10;

FIG. 22 is a diagram illustrating an operation panel that is an operation device for setting the thickness of a lamination film and the thickness of an inner sheet;

FIG. 23 is a diagram illustrating an example of a fixing temperature when the thickness of a lamination film and the thickness of an inner sheet are set;

FIG. 25 including FIGS. 25A and 25B is a flowchart of a series of operations from feeding of a lamination film to completion of ejection of the lamination film;

FIGS. 27A and 27B are schematic views of an ultrasonic sensor serving as a thickness detector that detects the thickness of an inner sheet;

FIGS. 28A and 28B are schematic views illustrating another detection mechanism that detects the film thickness of a lamination film and the sheet thickness of an inner sheet;

FIG. 29 is a schematic diagram illustrating encoder pulses output by an encoder; and FIG. 30 including

Figure 1:
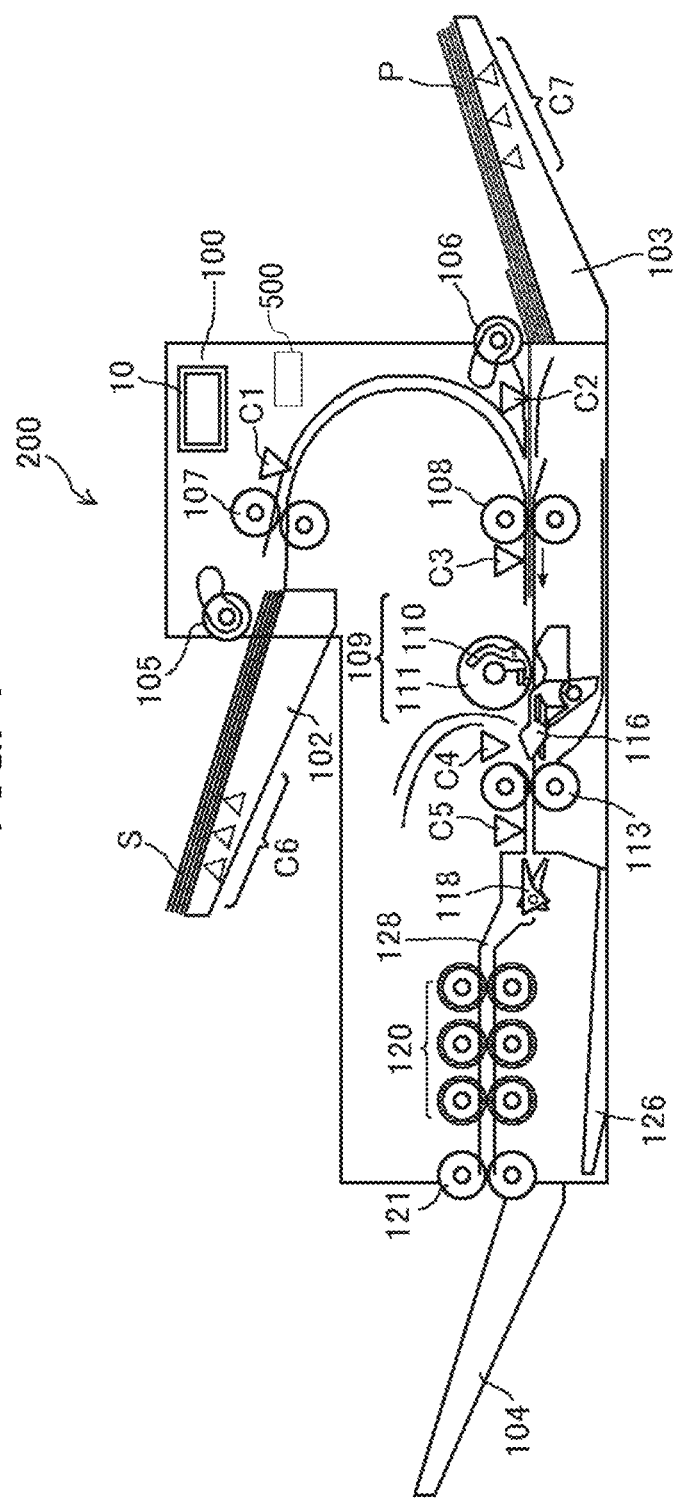
FIG. 1 is a schematic view illustrating an overall configuration of a sheet processing apparatus according to an embodiment of the present disclosure.

The accompanying drawings are intended to depict embodiments of the present disclosure and should not be interpreted to limit the scope thereof. The accompanying drawings are not to be considered as drawn to scale unless explicitly noted. Also, identical or similar reference numerals designate identical or similar components throughout the several views.

DETAILED DESCRIPTION

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

It will be understood that if an element or layer is referred to as being "on," "against," "connected to" or "coupled to" another element or layer, then it can be directly on, against, connected or coupled to the other element or layer, or intervening elements or layers may be present. In contrast, if an element is referred to as being "directly on," "directly connected to" or "directly coupled to" another element or layer, then there are no intervening elements or layers present. Like numbers referred to like elements throughout. As used herein, the term "and/or" includes any and all combinations of one or more of the associated listed items.

Spatially relative terms, such as "beneath," "below," "lower," "above," "upper" and the like may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements describes as "below" or "beneath" other elements or features would then be oriented "above" the other elements or features. Thus, term such as "below" can encompass both an orientation of above and below. The device may be otherwise oriented (rotated 90 degrees or at other orientations) and the spatially relative descriptors herein interpreted accordingly.

The terminology used herein is for describing particular embodiments and examples and is not intended to be limiting of exemplary embodiments of this disclosure. As used herein, the singular forms "a," "an," and "the" are intended to include the plural forms as well, unless the context clearly indicates otherwise. It will be further understood that the terms "includes" and/or "including," when used in this specification, specify the presence of stated features, integers, steps, operations, elements, and/or components, but do not preclude the presence or addition of one or more other features, integers, steps, operations, elements, components, and/or groups thereof.

Referring now to the drawings, embodiments of the present disclosure are described below. In the drawings for explaining the following embodiments, the same reference codes are allocated to elements (members or components) having the same function or shape and redundant descriptions thereof are omitted below.

In a laminate processing machine of the related art, for example, an operation of sandwiching an inner sheet (e.g., a paper sheet or a photograph) between films is manually performed sheet by sheet. However, it may be troublesome to peel off a lamination film by hand due to poor slip caused by the presence of an adhesive layer on the inside of the film, and it may also be troublesome to hold a sheet or the like to be sandwiched in an accurate position after peeling off. Further, when one sheet is prepared and set in the processing machine (laminator), the lamination processing may take 30 to 60 seconds. Accordingly, the user may need to wait until the next processing. As a result, the user may not be able to leave the laminator for a long time even when the user laminates only several tens of sheets. The user may need to repeat works of sandwiching an inner sheet, setting a lamination sheet, performing lamination processing, and sandwiching the sheet while waiting. There was a problem that the user had to repeat the works, which required time and manpower. Further, if it is attempted to avoid the problem, for example, a dedicated laminator using a roll film is needed. However, such a dedicated laminator is very expensive (e.g., hundreds of thousands of yen to millions of yen).

Alternatively, a laminator that automatically performs fixing of a lamination film may not appropriately perform fixing if the fixing temperature is too high or too low with respect to the thickness of the lamination film or the thickness of the inner sheet. Accordingly, it is preferable to set an appropriate fixing temperature. Therefore, it is preferable to acquire not only the sheet thickness of the inner sheet but also the thickness of the lamination film to determine the fixing temperature.

As described above, for example, there is known a technique for determining a fixing temperature based on information of the thickness of an inner sheet in order to laminate a processing object in which the inner sheet is inserted between two lamination films. However, since the fixing temperature is determined based on only the information of the thickness of the inserted inner sheet, for example, adhesion failure, wrinkles, or warpage of the lamination films occurs, causing a poor finished state. Accordingly, when information (e.g., thickness) of the lamination film is separately acquired and the set temperature is finely adjusted by the user, work efficiency is reduced.

As described below, according to at least one embodiment of the present disclosure, a two-ply sheet and a sheet medium can be laminated at an appropriate fixing temperature.

FIG. 1 is a schematic diagram illustrating a general arrangement of a sheet processing apparatus according to an embodiment of the present disclosure. A sheet processing apparatus 100 according to the present embodiment is to separate two sheets (plies) of a two-ply sheet (hereinafter referred to as a lamination sheet S) and to insert and sandwich an inner sheet P (an example of a sheet medium) between the separated sheets of the two-ply sheet.

The lamination sheet S is a two-ply sheet constructed of two overlapping sheets (plies) and bonded (or joined) at one portion (or on one side). For example, there is a two-ply sheet in which a first side is a transparent sheet such as a transparent polyester sheet and the opposite side is a transparent or opaque sheet and bonded to the other sheet on one side thereof. The two-ply sheet also includes a lamination film.

The inner sheet P is an example of a sheet medium that is inserted into the two-ply sheet. Examples of the sheet medium include thick paper, postcards, envelopes, plain paper, thin paper, coated paper, art paper, tracing paper, and overhead projector (OHP) transparencies.

As illustrated in FIG. 1, the sheet processing apparatus 100 includes a sheet tray 102 serving as a first tray that stacks lamination sheets S and has a sheet-size detection sensor C6, a pickup roller 105 that feeds the lamination sheet S from the sheet tray 102, a conveyance roller pair 107, and a path that reverses the lamination sheet S. The sheet processing apparatus 100 also includes a sheet feed tray 103 serving as a second tray that stacks the inner sheets P and has an inner-sheet-size detection sensor C7, and a pickup roller 106 that feeds the inner sheet P from the sheet feed tray 103. The sheet-size detection sensor C6 can obtain information on the lengths of the lamination sheets S in a sheet conveyance direction, and the inner-sheet-size detection sensor C7 can obtain information on the length of the inner-sheet P in the sheet conveyance direction.

A conveyance sensor C1 is disposed downstream from the conveyance roller pair 107 in the sheet conveyance direction to detect the sheet conveyance position of the lamination sheet S. A conveyance sensor C2 is disposed downstream from the pickup roller 106 in the sheet conveyance direction to detect the sheet conveyance position of the inner sheet P.

The sheet processing apparatus 100 includes an entrance roller pair 108 as a first conveyor, a winding roller 109 as a rotator, the exit roller pair 113 as a second conveyor, and the sheet ejection tray 104 to stack ejected lamination sheets S. The entrance roller pair 108, the winding roller 109, the exit roller pair 113, and the sheet ejection tray 104 are disposed downstream from the conveyance roller pair 107 and the pickup roller 106 in the sheet conveyance direction. The sheet processing apparatus 100 further includes separation claws 116 between the winding roller 109 and the exit roller pair 113. The separation claws 116 are movable in the width direction of the lamination sheet S. The separation claws 116 serve as a separator that separates the lamination sheet S according to the present embodiment.

A sheet sensor C3 is disposed downstream from the entrance roller pair 108 in the sheet conveyance direction to detect the conveyance position of the lamination sheet S and the sheet conveyance position of the inner sheet PM. An abnormality detector C4 is disposed downstream from the winding roller 109 in the sheet conveyance direction to detect the state of the lamination sheet S. The abnormality detector C4 functions as a sheet sensor C4. A sheet sensor C5 is disposed downstream from the exit roller pair 113 in the sheet conveyance direction to detect the sheet conveyance position of the lamination sheet S.

The pickup roller 105, the conveyance roller pair 107, the entrance roller pair 108, and the winding roller 109 are examples of a first feeder to feed a two-ply sheet. The pickup roller 106, the entrance roller pair 108 and the winding roller 109 are examples of a second feeder.

The sheet processing apparatus 100 includes heat pressing rollers 120, a heat-pressing conveyance path 128, a non-heat-pressing conveyance path 129, and a branching claw 118. The heat pressing roller 120 is a heat pressing member that heats and presses a lamination sheet S in which an inner sheet P as a sheet-shaped medium is sandwiched. The heat pressing rollers 120 are disposed on the heat-pressing conveyance path 128 and are not disposed on the non-heat-pressing conveyance path 129. The branching claw 118 is a branching member that branches the lamination sheet S into the heat-pressing conveyance path 128 or the non-heat-pressing conveyance path 129.

A lamination sheet S conveyed through the heat-pressing conveyance path 128, which are provided with the heat pressing rollers 120, and ejected from the heat-pressing conveyance path 128 is ejected and stacked on the sheet ejection tray 104. A lamination sheet S conveyed through the non-heat-pressing conveyance path 129, which are not provided with the heat pressing rollers 120, and ejected from the heat-pressing conveyance path 128 is ejected and stacked on a sheet ejection tray 126.

The branching claw 118 that switches the conveyance path of the lamination sheet S is disposed downstream in the conveyance direction of the conveyance sensor C5. The heat-pressing conveyance path 128 and the non-heat-pressing conveyance path 129 are formed downstream of the branching claw 118. The heat pressing rollers 120 and an ejection roller pair 121 disposed downstream from the heat pressing rollers 120 and in the vicinity of a sheet ejection port are disposed on the heat-pressing conveyance path 128.

An operation panel 10 is provided on the exterior of the sheet processing apparatus 100. The operation panel 10 serves as a display-operation device to display information of the sheet processing apparatus 100 and receives input of the operation of the sheet processing apparatus 100. In addition, the operation panel 10 also serves as a notification unit that issues a perception signal to the user. As an alternative, a notification device other than the operation panel 10 may be separately provided in the sheet processing apparatus 100.

The sheet processing apparatus 100 according to the present embodiment stores the lamination sheet S and the inner sheet P on separate trays. The sheet processing apparatus 100 opens the lamination sheet S and inserts the inner sheet P therein while conveying the lamination sheet S. The exit roller pair 113 ejects and stacks the lamination sheet S, in which the inner sheet P has been inserted, onto the sheet ejection tray 104.

Figure 2:
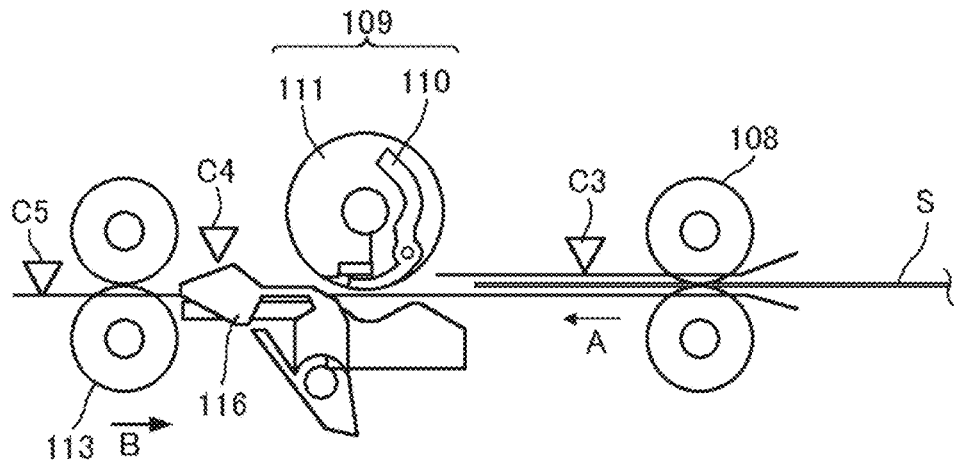
FIG. 2 is a schematic view of a main part of the sheet processing apparatus of FIG. 1.

FIG. 2 is a block diagram illustrating a main part of the sheet processing apparatus illustrated in FIG. 1. As illustrated in FIG. 2, each of the entrance roller pair 108 and the exit roller pair 113 is, for example, two rollers paired with each other and driven by a driving device (e.g., a motor). The entrance roller pair 108 rotates in one direction. The exit roller pair 113 rotates in forward and reverse directions, thereby nipping and conveying the lamination sheet S and the inner sheet P.

The entrance roller pair 108 conveys the lamination sheet S and the inner sheet P toward the exit roller pair 113. The sheet conveyance direction indicated by arrow A in FIG. 2 is referred to as a forward conveyance direction or a direction A.

The exit roller pair 113 can switch the direction of rotation between the forward direction and the reverse direction. The exit roller pair 113 conveys the lamination sheet S nipped by the rollers of the exit roller pair 113 toward the sheet ejection tray 104 (see FIG. 1) in the forward conveyance direction and also conveys the lamination sheet S toward the winding roller 109 in the direction opposite the forward conveyance direction (to convey the lamination sheet S in reverse). The sheet conveyance direction toward the winding roller 109, which is indicated by arrow B in FIG. 4 and a direction opposite to the forward conveyance direction, is referred to as a reverse conveyance direction or a direction B.

The sheet processing apparatus 100 is provided with the winding roller 109 as a rotator and the separation claws 116 that are disposed between the entrance roller pair 108 and the exit roller pair 113. The winding roller 109 is driven by the driving device such as a motor to rotate in the forward direction and the reverse direction. The direction of rotation of the winding roller 109 is switchable between the forward direction (i.e., clockwise direction) and the reverse direction (i.e., counterclockwise direction).

The winding roller 109 includes a roller 111 and a movable gripper 110 disposed on the roller 111 to grip the lamination sheet S. The gripper 110 that is movable grips a trailing end of the lamination sheet S in the forward conveyance direction together with the roller 111. The gripper 110 may be integrated with the outer circumference of the roller 111, or may be a separate component.

The entrance roller pair 108, the exit roller pair 113, the winding roller 109, and the separation claws 116 are an example of an inserter that inserts the inner sheet P into the lamination sheet S.

Next, a description is given of a series of operations performed in the sheet processing apparatus 100, with reference to FIGS. 1 to 14. The series of operations performed in the sheet processing apparatus 100 indicates the operations from separating the lamination sheet S to inserting the inner sheet P into the lamination sheet S. Note that, in FIGS. 3 to 14, elements identical to the elements illustrated in FIGS. 1 and 2 are given identical reference numerals, and the detailed descriptions of these elements are omitted.

In FIG. 1, the lamination sheets S are stacked on the sheet tray 102 such that the bonded side is on the downstream side in the direction of feeding (conveyance direction) of the pickup roller 105. The sheet processing apparatus 100 picks up the lamination sheet S on the sheet tray 102 by the pickup roller 105 and conveys the lamination sheet S toward the entrance roller pair 108 by the conveyance roller pair 107.

Next, as illustrated in FIG. 2, the entrance roller pair 108 conveys the lamination sheet S toward the winding roller 109. The sheet processing apparatus 100 conveys the lamination sheet S with the bonded end (the bonded end is one of four sides) on the downstream side in the forward conveyance direction indicated by arrow A (direction A).

Figure 3:
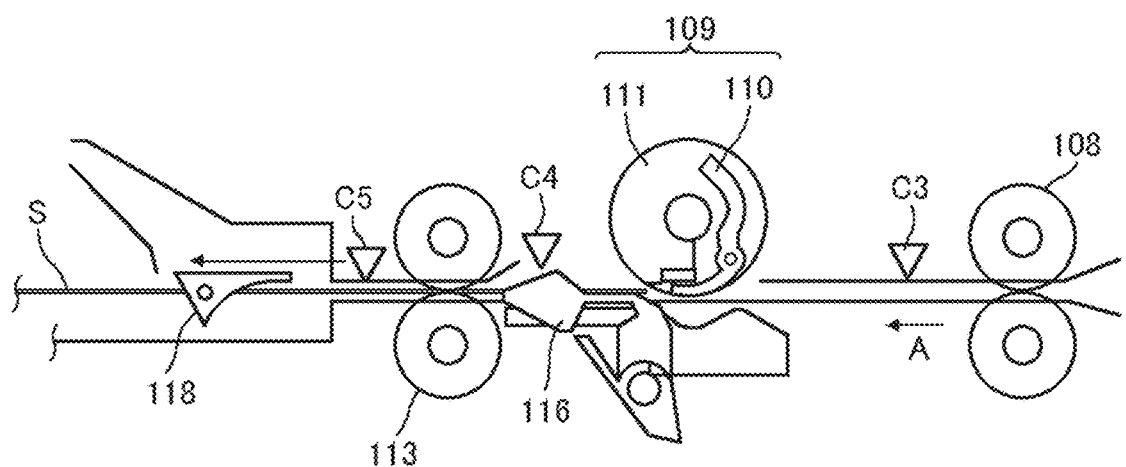
FIG. 3 is a schematic view illustrating the main part of the sheet processing apparatus, subsequent to the state illustrated in FIG. 2.

Subsequently, as illustrated in FIG. 3, the sheet processing apparatus 100 temporarily stops conveyance of the lamination sheet S when the trailing end of the lamination sheet S in the forward conveyance direction has passed the winding roller 109. Note that these operations are performed by conveying the lamination sheet S from the conveyance sensor C3 by a designated amount in response to the conveyance sensor C3 detecting the leading end of the lamination sheet S.

Figure 4:
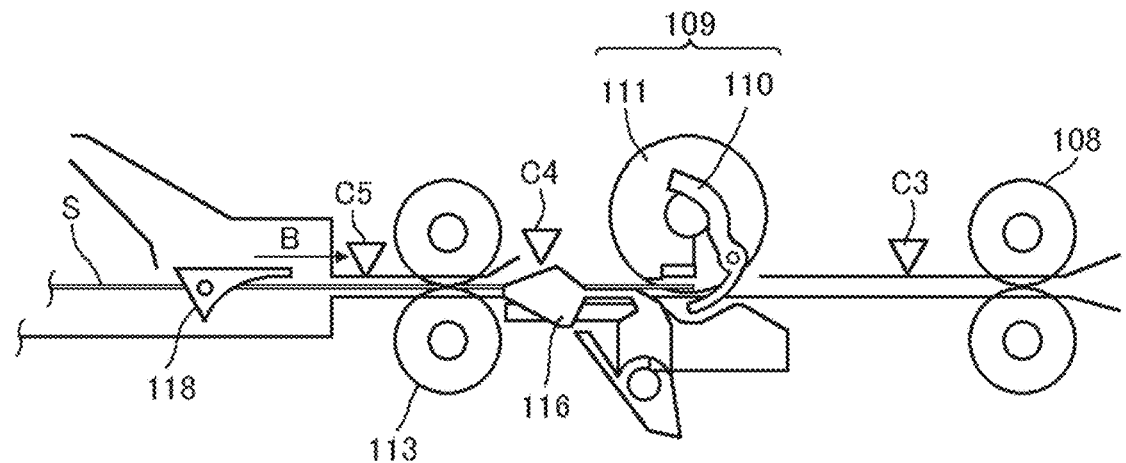
FIG. 4 is a schematic view of the main part of the sheet processing apparatus, subsequent to the state illustrated in FIG. 3.

Next, as illustrated in FIG. 4, the sheet processing apparatus 100 causes the gripper 110 to open and the exit roller pair 113 to rotate in the reverse direction to convey the lamination sheet S in the reverse conveyance direction (i.e., the direction B) toward an opening portion of the gripper 110.

Figure 5:
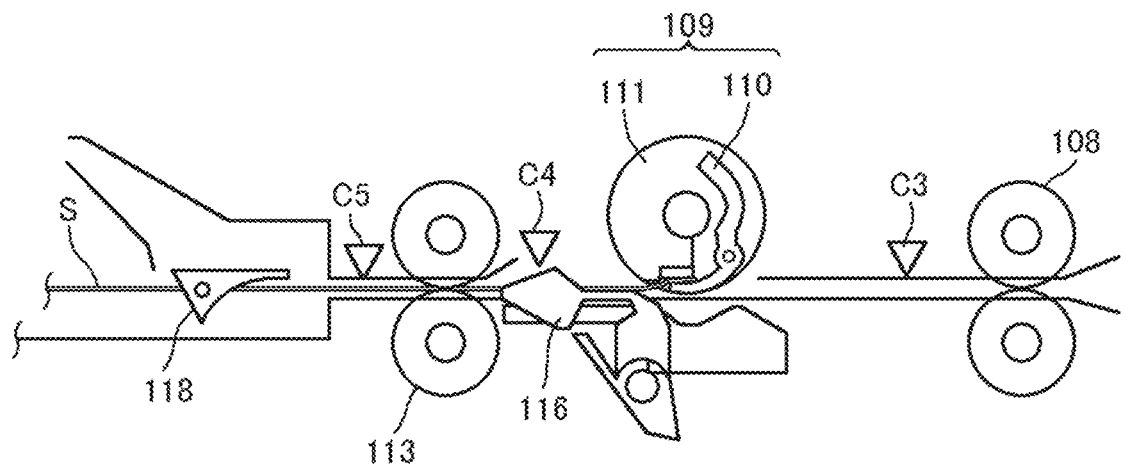
FIG. 5 is a schematic view of the main part of the sheet processing apparatus, subsequent to the state illustrated in FIG. 4.

Subsequently, as illustrated in FIG. 5, the sheet processing apparatus 100 causes the exit roller pair 113 to stop rotating and conveyance of the lamination sheet S when the trailing end of the lamination sheet S is inserted into the opening portion of the gripper 110, and causes the gripper 110 to close and grip the trailing end of the lamination sheet S. Note that these operations are performed when the lamination sheet S is conveyed by the designated amount.

Figure 6:
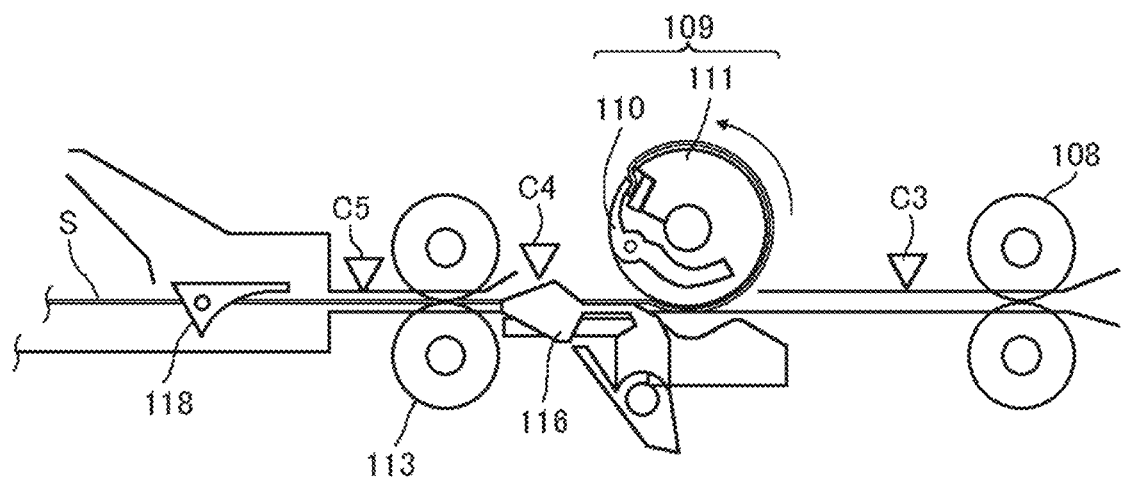
FIG. 6 is a schematic view of the main part of the sheet processing apparatus, subsequent to the state illustrated in FIG. 5.

Then, as illustrated in FIG. 6, the sheet processing apparatus 100 causes the driver to rotate the winding roller 109 in the counterclockwise direction in FIG. 6 to wind the lamination sheet S around the winding roller 109. The lamination sheet S is wound around the winding roller 109 from the side where the two overlapping sheets of the lamination sheet S are not bonded.

Figure 7:
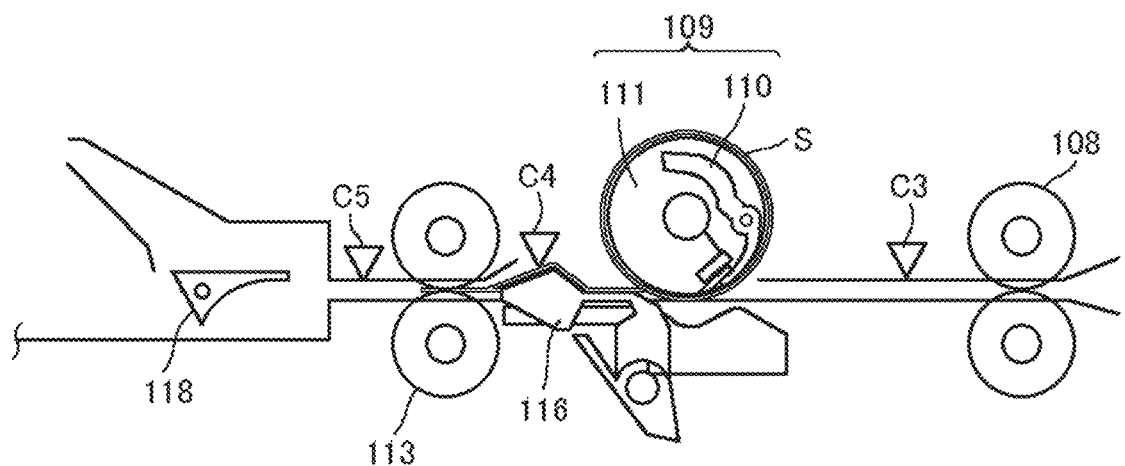
FIG. 7 is a schematic view of the main part of the sheet processing apparatus, subsequent to the state illustrated in FIG. 6.

As illustrated in FIG. 7, when the lamination sheet S is wound around the winding roller 109, a difference is created between the two sheets in the amount of winding of the lamination sheet S around circumference of the winding roller 109. There is a surplus of the inner ply, which becomes loose toward the bonded end. As a result, a space is created between the two sheets constructing the two-ply sheet. As inserting the separation claws 116 are inserted into the generated space from both sides of the lamination sheet S, the space between the two sheets can be reliably maintained. Note that in response to detection of the leading end of the lamination sheet S with the conveyance sensor C5, the lamination sheet S is conveyed from the conveyance sensor C5 by a designated amount to perform these operations.

Figure 8:
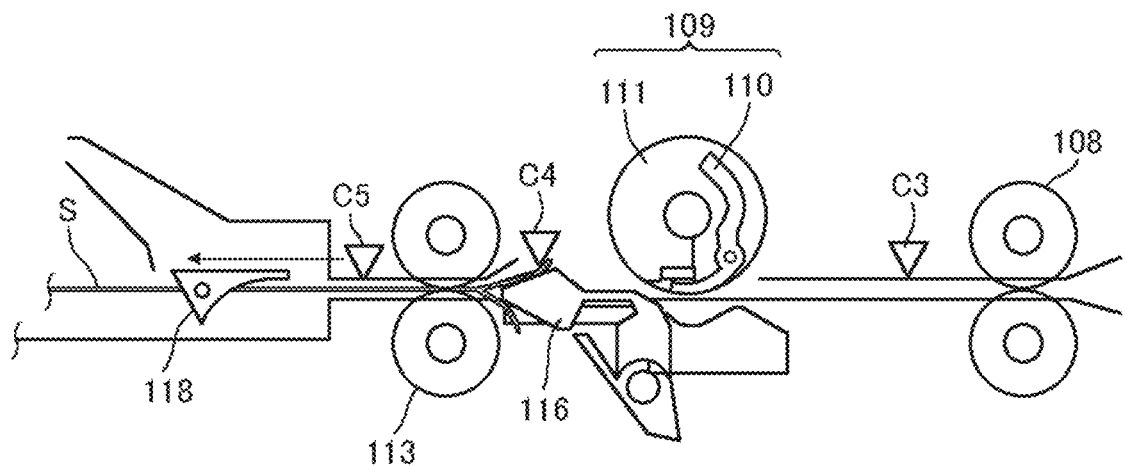
FIG. 8 is a schematic view of the main part of the sheet processing apparatus, subsequent to the state illustrated in FIG. 7.

With the separation claws 116 inserted in the space in the lamination sheet S (see FIG. 7), the sheet processing apparatus 100 causes the winding roller 109 to rotate in the clockwise direction and shift the space formed in the lamination sheet S to the trailing end of the lamination sheet S in the forward conveyance direction (i.e., the direction A), as illustrated in FIG. 8. After the winding roller 109 has been rotated by a designated amount, the sheet processing apparatus 100 causes the gripper 110 to open. As a result, the lamination sheet S is separated into the upper and lower sheets at the trailing end.

In this state, the sheet processing apparatus 100 temporarily stops the conveyance of the lamination sheet S and further moves the separation claws 116 in the width direction of the lamination sheet S to separate the whole area of the trailing end of the lamination sheet S. When the conveyance sensor C5 detects the leading end of the lamination sheet S, the sheet processing apparatus 100 receives a trigger signal from the conveyance sensor C5. The sheet processing apparatus 100 causes the exit roller pair 113 to convey the lamination sheet S by a designated amount from the conveyance sensor C5.

Figure 9:
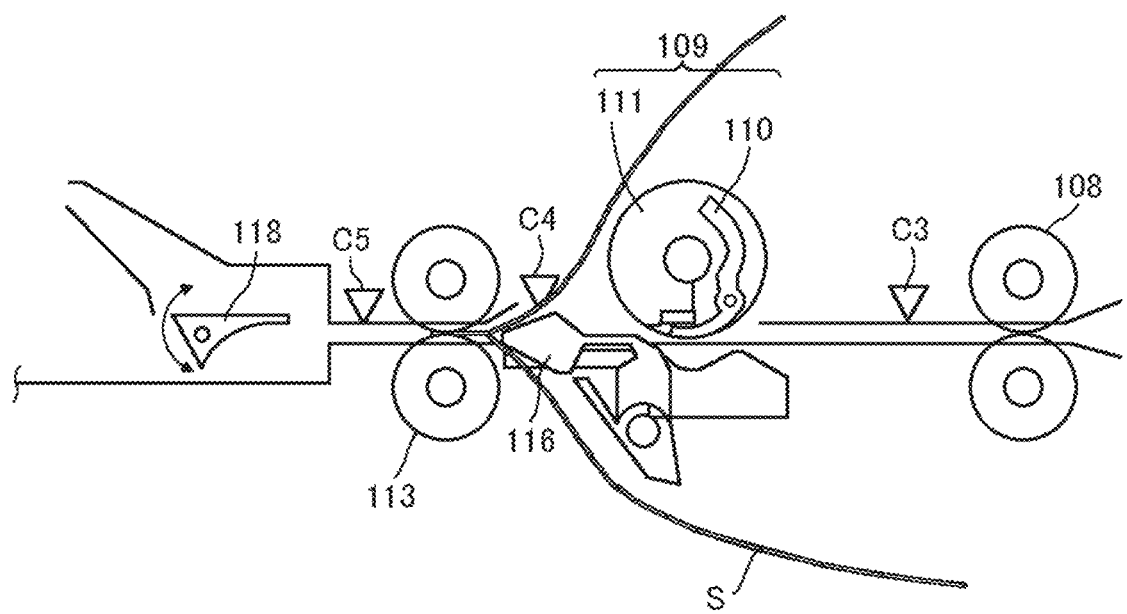
FIG. 9 is a schematic view of the main part of the sheet processing apparatus, subsequent to the state illustrated in FIG. 8.

In the state illustrated in FIG. 8, the sheet processing apparatus 100 causes the exit roller pair 113 to rotate counterclockwise and convey the lamination sheet S in the reverse conveyance direction (i.e., the direction B) as illustrated in FIG. 9. A branching claw 118 can be switched at the time when the leading end of the lamination sheet S passes through the conveyance sensor C5. When the lamination sheet S is conveyed to the non-thermal pressure conveyance path, the branching claw 118 remains at the position illustrated in FIG. 9. When the lamination sheet S is conveyed to the heat-pressing conveyance path 128, the branching claw 118 is switched to the non-heat-pressing conveyance path side.

The switching of the branching claw 118 may be completed in a period of time from when the leading end of the lamination sheet S passes through the conveyance sensor C5 to when the leading end of the lamination sheet S reaches the branching claw 118 after insertion of the inner sheet P. If the branching claw 118 is switched before this timing, the lamination sheet S before insertion of the inner sheet enters the fixing path and a part of the lamination sheet S is fixed.

If the position of a fixing unit is disposed further downstream in the sheet conveyance direction in order to prevent such a failure, the size of the sheet processing apparatus would be increased.

As illustrated in FIG. 9, the separation claws 116 guide the two sheets separated from the lamination sheet S in the upper and lower directions, respectively, and thus the two sheets are fully separated. The sheet processing apparatus 100 temporarily stops the conveyance of the lamination sheet S, so that the bonded portion of the lamination sheet S is held (nipped) by the exit roller pair 113. Accordingly, one end of the lamination sheet S is bonded as the bonded side of the lamination sheet S and the other end of the lamination sheet S is opened widely.

When the conveyance sensor C5 detects the leading end of the lamination sheet S, the sheet processing apparatus 100 receives a trigger signal from the conveyance sensor C5. The sheet processing apparatus 100 causes the exit roller pair 113 to convey the lamination sheet S by a designated amount from the conveyance sensor C5.

Modification

Figure 17A:
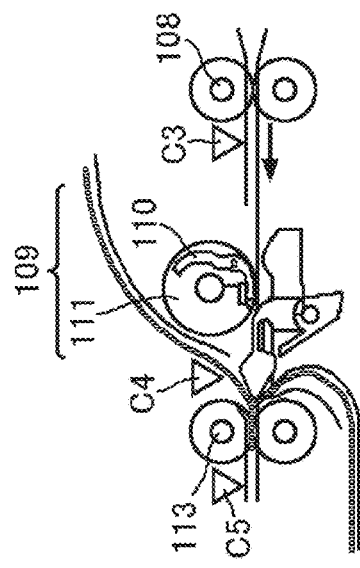
FIGS. 17A, 17B, and 17C are modification examples of a guide path of two peeled sheets.
Figure 17B:
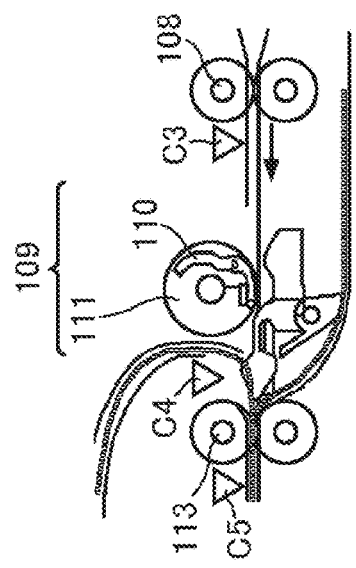
Figure 17C:
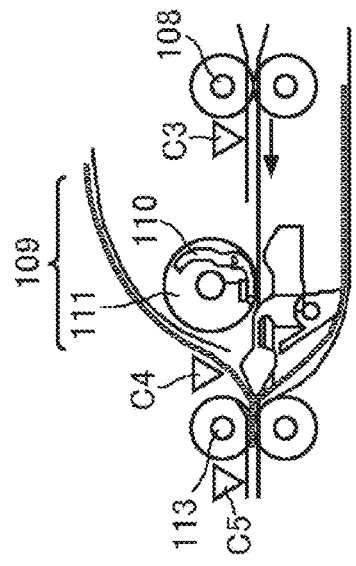

FIGS. 17A, 17B, and 17C illustrate modification examples of the guide path of two separated sheets. The sheet processing apparatus 100 illustrated in FIG. 17A has the same sheet guide paths as the sheet processing apparatus 100 illustrated in FIG. 9 to guide the upper and lower sheets in the same direction from the bonded portion of the lamination sheet S. Alternatively, as illustrated in FIG. 17B, the sheet processing apparatus 100 may have sheet guide paths extending in different directions in an inverted S shape to guide the upper and lower sheets in different directions. Further, as illustrated in FIG. 17C, the sheet processing apparatus 100 may have sheet guide paths extending in different directions in an S shape to guide the upper and lower sheets in different directions which are opposite the directions of the sheet guide paths in the sheet processing apparatus 100 illustrated in FIG. 17B.

FIGS. 10 to 14 illustrate an operation of the sheet processing apparatus 100 when the lamination sheet S is conveyed to the heat-pressing conveyance path 128 in a case where the user selects the lamination processing mode on the operation panel 10.

Next, as illustrated in FIG. 10, the sheet processing apparatus 100 causes the entrance roller pair 108 to rotate and convey the inner sheet P conveyed by the pickup roller 106 from the sheet feed tray 103 (see FIG. 1) toward the exit roller pair 113 in the forward conveyance direction (i.e., the direction A).

Subsequently, as illustrated in FIG. 11, the sheet processing apparatus 100 rotates the exit roller pair 113 so that the lamination sheet S and the inner sheet P meet to insert the inner sheet P into the lamination sheet S from the open portion (on the other end) of the lamination sheet S.

Figure 12:
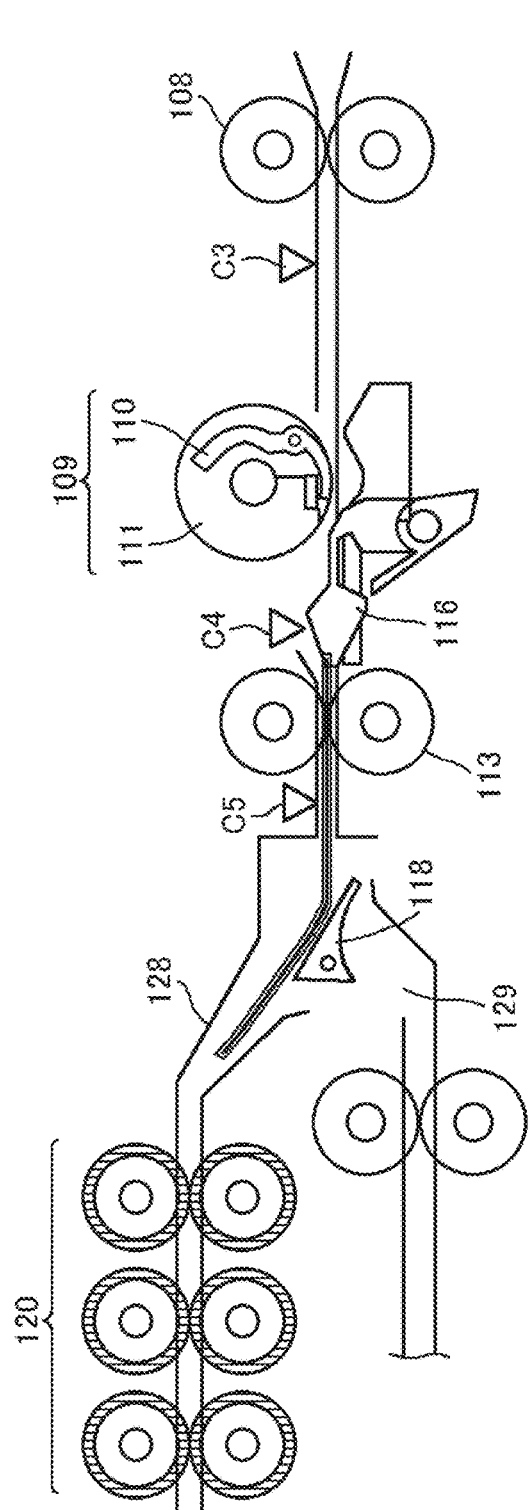
FIG. 12 is a schematic view of the main part of the sheet processing apparatus, subsequent to the state illustrated in FIG. 11.

Then, as illustrated in FIG. 12, the exit roller pair 113 of the sheet processing apparatus 100 conveys the lamination sheet S in which the inner sheet P is inserted, in the forward conveyance direction (the direction A). Thus, the two sheets of the lamination sheet S are overlapped one on another again so as to close the open portion of the lamination sheet S.

Figure 13:
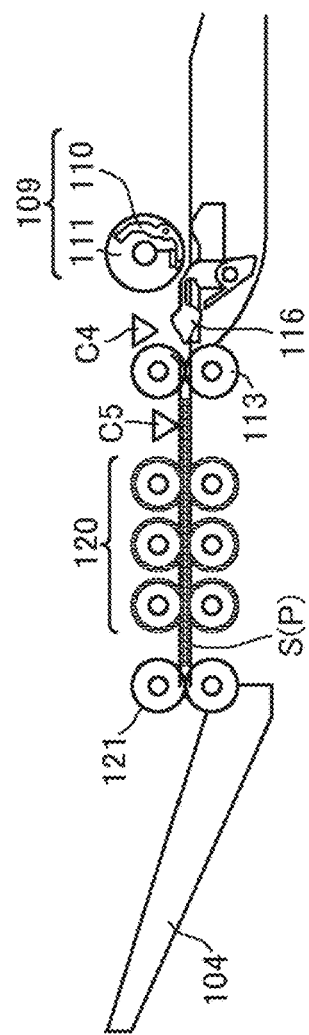
FIG. 13 is a schematic view of the main part of the sheet processing apparatus, subsequent to the state illustrated in FIG. 12.
Figure 14:
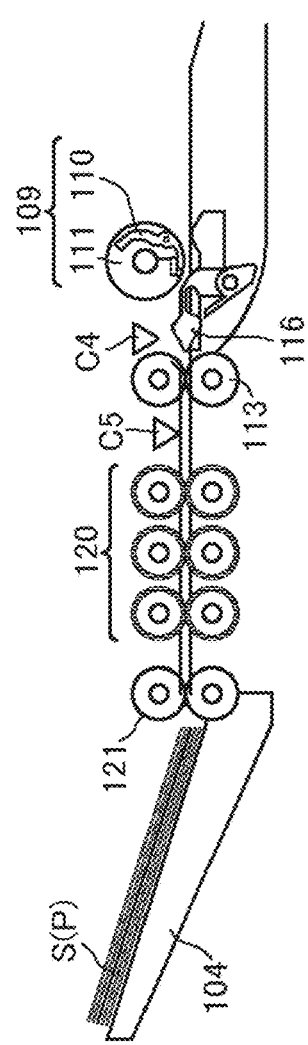
FIG. 14 is a schematic view of the main part of the sheet processing apparatus, subsequent to the state illustrated in FIG. 13.

Then, as illustrated in FIG. 13, the lamination sheet S in which the inner sheet P is sandwiched is conveyed to a fixing unit having the heat pressing rollers 120 by the exit roller pair 113 or rollers disposed after the exit roller pair 113, and lamination processing is performed on the lamination sheet S.

The lamination sheet S in which the inner sheet P has been sandwiched is ejected and stacked on the sheet ejection tray 104 by the rotation of the ejection roller pair 121.

These operations are the same regardless of whether the inserted inner sheet P is one sheet or two or more sheets. The heat pressing roller 120 may include a thermocouple (temperature sensor) that detects whether the temperature of the heat pressing roller 120 has increased to the fixing temperature.

FIGS. 2 to 14 illustrate a basic separate operation and a conveying operation to a fixing unit Md (fixing unit) in the case of performing the lamination processing.

As described above, the sheet processing apparatus 100 according to the present embodiment causes the driver to open the lamination sheet S so as to insert and nip the inner sheet P into the lamination sheet S. Accordingly, since the configuration of the sheet processing apparatus 100 is simpler than the configuration of a typical sheet laminator employing a vacuum device, the entire sheet processing apparatus has a simpler and smaller configuration.

As illustrated in FIG. 1, the sheet processing apparatus 100 according to the present embodiment loads the lamination sheet S and the inner sheet P on separate trays, and can feed and convey the lamination sheet S and the inner sheet P separately. Accordingly, the convenience for a user is enhanced without loading the lamination sheet S and the inner sheet P in the predetermined order.

Figure 15:
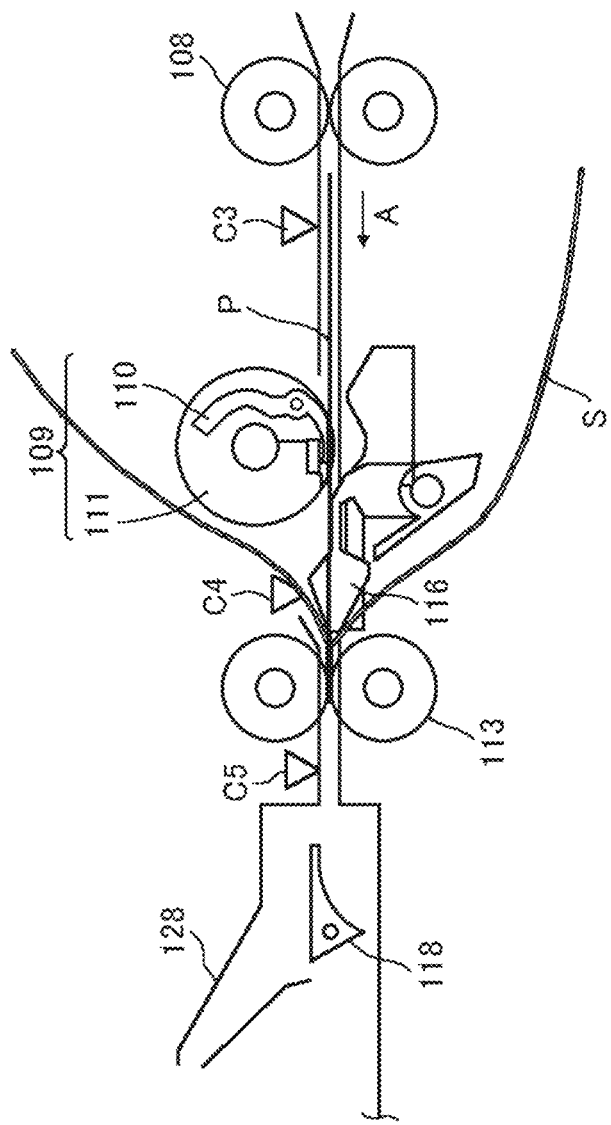
FIG. 15 is a schematic view of the main part of the sheet processing apparatus in an inner-sheet insertion mode.
Figure 16:
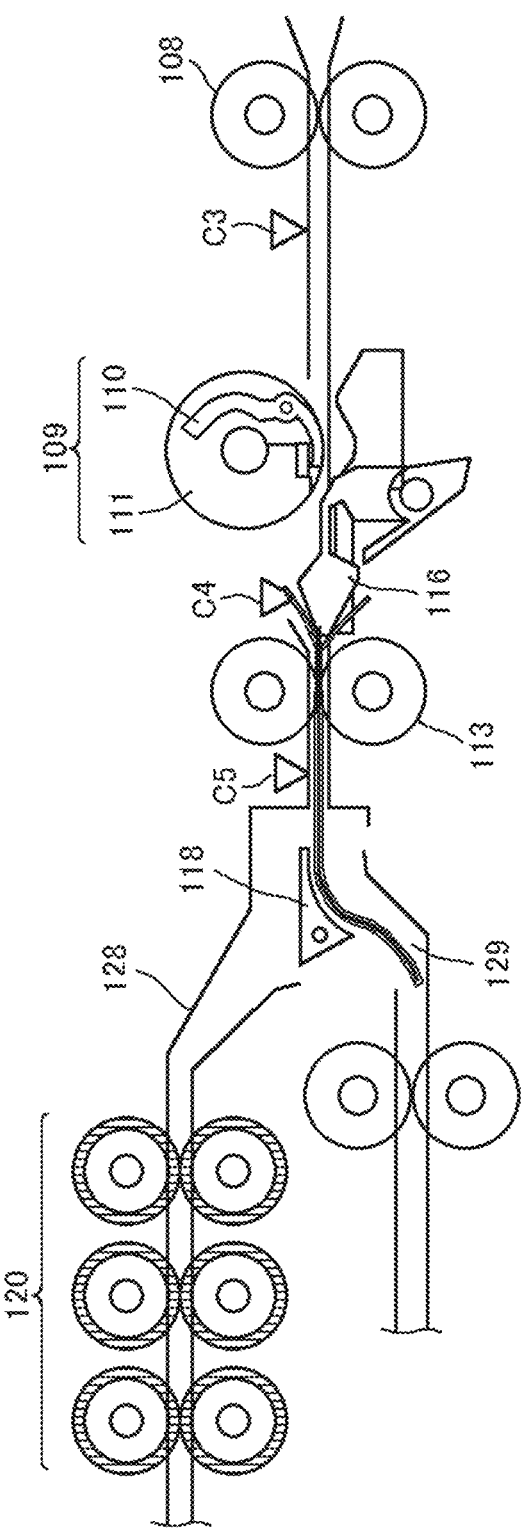
FIG. 16 is a schematic view of the main part of the sheet processing apparatus, subsequent to the state illustrated in FIG. 15.

Alternatively, when the user selects an inner-sheet insertion mode on the operation panel 10, the sheet processing apparatus 100 operates as illustrated in FIGS. 15 and 16.

The sheet processing apparatus 100 operates in the same manner in FIGS. 2 to 9. As illustrated in FIG. 15, the inner sheet P is conveyed as it is, without switching the branching claw 118, to convey the inner sheet P to the non-heat-pressing conveyance path 129.

Next, as illustrated in FIG. 16, in a state in which both the lamination sheet S and the inner sheet P are gripped (nipped), the lamination sheet S and the inner sheet P are conveyed by the exit roller pair 113, so that the inner sheet P is inserted into the two sheets S. Subsequently, the lamination sheet S is conveyed to the non-heat-pressing conveyance path 129 that does not have the heat pressing rollers 120, and is ejected and stacked on the sheet ejection tray 126 (see FIG. 1) to complete the sheet ejection.

In this way, the user can obtain the sheet in the state where the inner sheet is inserted, and the sheet can be fixed on an offline machine.

FIG. 1 illustrates a laminator including a sheet processing apparatus according to an embodiment of the present disclosure. The laminator 200 includes the ejection roller pair 121 disposed downstream from the heat pressing roller 120, the sheet ejection tray 104 to stack lamination sheets S conveyed through the heat-pressing conveyance path 128, and the sheet ejection tray 126 to stack the lamination sheets S conveyed through the non-heat-pressing conveyance path 129 having no heat pressing rollers 120.

The laminator 200 can perform a series of operations from feeding and separation of the lamination sheet S, insertion of the inner sheet P, and lamination with heat and pressure on a stand-alone basis. This series of operations is carried out automatically without any aid of a user, and therefore the sheet laminator enhances and provides the convenience better than a know sheet laminator employing a known technique.

However, the lamination processing is an example of sheet processing, and the laminator may be broadly referred to as a sheet processing apparatus.

Next, a description is given of a laminator, an image forming apparatus, and an image forming system, each including the sheet processing apparatus according to an embodiment of the present disclosure.

Figure 18:
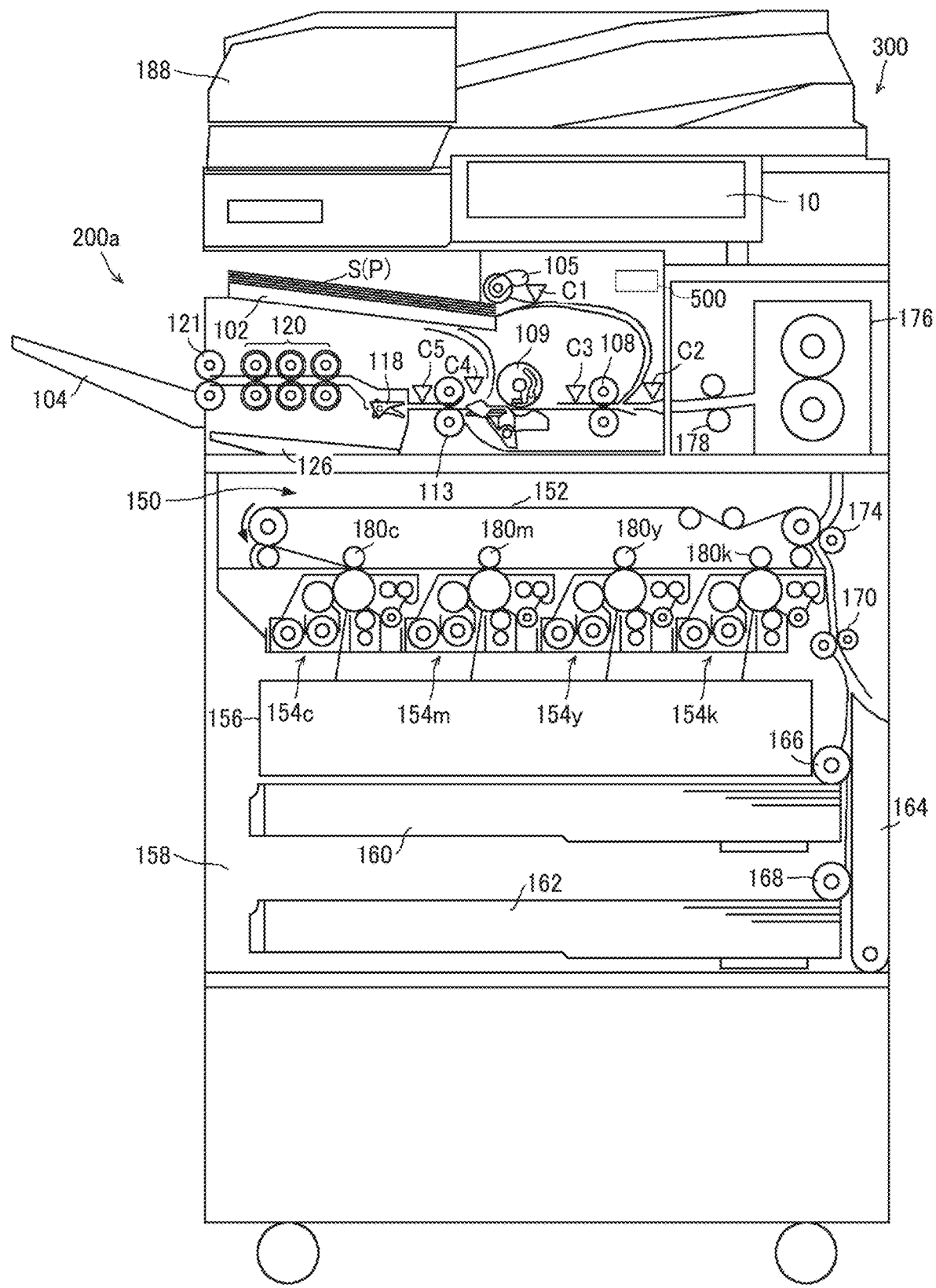
FIG. 18 is a schematic diagram illustrating an overall configuration of an image forming apparatus including a laminator according to an embodiment of the present disclosure.

FIG. 18 is a schematic view illustrating the overall configuration of an example of an image forming apparatus according to an embodiment of the present disclosure, including the laminator according to an embodiment of the present disclosure. An image forming apparatus 300 according to the present embodiment includes a laminator 200a as a device that performs sheet lamination inside the image forming apparatus 300.

The laminator 200a includes the sheet tray 102 on which the lamination sheet S or the inner sheet P are loaded. The laminator 200a is capable of receiving the lamination sheet S, the inner sheet P, or both from the image forming apparatus 300. Accordingly, the image forming apparatus 300 (e.g., a printer or a copier) is capable of adding (forming) an image on the lamination sheet S or the inner sheet P by the in-line connection. Further, the image forming apparatus 300 is provided with an operation panel 10 as an information acquisition device, and the information acquisition device acquires information of the lamination sheet S and the inner sheet P from a main unit of the image forming apparatus 300. Examples of the information include information on the thickness of the lamination sheet S and information on the thickness of the inner sheet P.

The configuration of the image forming apparatus 300 is described in detail. As illustrated in FIG. 18, an intermediate transfer device 150 is disposed in the main body of the image forming apparatus 300. The intermediate transfer device 150 includes an intermediate transfer belt 152 of an endless shape looped around a plurality of rollers and stretched substantially horizontally. The intermediate transfer belt 152 rotates in the counterclockwise direction in FIG. 18.

The image forming apparatus 300 further includes image forming devices 154c, 154m, 154y, and 154k for yellow (Y), magenta (M), cyan (C), and black (K), respectively. The image forming devices 154c, 154m, 154y, and 154k are disposed below the intermediate transfer device 150 in a quadruple tandem manner along an extended direction of the intermediate transfer belt 152. Each of the image forming devices 154c, 154m, 154y, and 154k includes a drum-shaped image bearer that rotates in the clockwise direction in FIG. 18. Various image forming components, for example, a charging device, a developing device, a transfer device, and a cleaning device, are disposed around each of the image forming devices 154c, 154m, 154y, and 154k. An exposure device 156 is disposed below the image forming devices 154c, 154m, 154y, and 154k.

A sheet feeder 158 is disposed below the exposure device 156. The sheet feeder 158 includes a first sheet feeding tray 160 that stores lamination sheets S and a second sheet feeding tray 162 that stores inner sheets P. The first sheet feeding tray 160 is an example of a third tray on which two-ply sheets are stacked, and the second sheet feeding tray 162 is an example of a fourth tray on which sheet media are stacked.

A first sheet feeding roller 166 is disposed at the upper right of the first sheet feeding tray 160 and feeds the lamination sheets S from the first sheet feeding tray 160 one by one to a sheet feeding passage 164. A second sheet feeding roller 168 is disposed at the upper right of the second sheet feeding tray 162 and feeds the inner sheets P from the second sheet feeding tray 162 one by one to the sheet feeding passage 164.

The sheet feeding passage 164 extends from the lower side to the upper side on the right side in the main unit of the image forming apparatus 300 and communicates with the laminator 200a inside the image forming apparatus 300. The sheet feeding passage 164 is provided with a conveyance roller 170, a secondary transfer device 174 disposed opposite the intermediate transfer belt 152, a fixing device 176, a sheet ejection device 178 including a sheet ejection roller pair, and the like in this order.

The first sheet feeding roller 166, the conveyance roller 170, and the sheet feeding passage 164 are examples of a third feeder to feed a two-ply sheet from the first sheet feeding tray 160 serving as the third tray. The second sheet feeding roller 168, the conveyance roller 170, and the sheet feeding passage 164 are examples of a fourth feeder to feed a sheet medium from the second sheet feeding tray 162 serving as the fourth tray. The intermediate transfer device 150 and the fixing device 176 are examples of an image forming device that forms an image on a two-ply sheet or a sheet medium.

Next, a description is given of operations of the image forming apparatus 300 according to the present embodiment, to form an image on a lamination sheet S and then perform lamination processing on the lamination sheet S.

To form an image on the lamination sheet S, first, an image reading device 188 reads a document image, and the exposure device 156 performs writing of the document image. The image forming devices 154c, 154m, 154y, and 154k form toner images of yellow (Y), magenta (M), cyan (C), and black (K), respectively, on the image bearers. Then, primary transfer devices 180c, 180m, 180y, and 180k sequentially transfer the respective toner images onto the intermediate transfer belt 152, thereby forming a color image on the intermediate transfer belt 152.

The image forming apparatus 300 also rotates the first sheet feeding roller 166 to feed the lamination sheet S to the sheet feeding passage 164. The lamination sheet S is conveyed by the conveyance roller 170 through the sheet feeding passage 164 and is sent to a secondary transfer position in synchrony with movement of the color image on the intermediate transfer belt 152. Then, the secondary transfer device 174 transfers the color image formed on the intermediate transfer belt 152 as described above, onto the lamination sheet S.

After the color image has been transferred onto the lamination sheet S, the fixing device 176 fixes the color image on the lamination sheet S, and the sheet ejection device 178 sends the lamination sheet S to the laminator 200a.

The image forming apparatus 300 rotates the second sheet feeding roller 168 to feed the inner sheet P to the sheet feeding passage 164, and the sheet ejection device 178 sends the inner sheet P to the laminator 200a.

As described above, the lamination sheet S on which the image has been formed and the inner sheet P are conveyed to the laminator 200a, so that the lamination processing is performed by the laminator 200a. The details of the lamination processing have been described above and therefore descriptions thereof are omitted here.

According to the above-described configuration of the image forming apparatus 300 according to the present embodiment, the laminator 200a can also perform the lamination processing after an image is formed on the inner sheet P. The laminator 200a may also perform the lamination processing after images are formed on the inner sheet P and the lamination sheet S.

Next, descriptions are given of an image forming apparatus and an image forming system including the sheet processing apparatus, according to a modification of the above-described embodiment.

Figure 19:
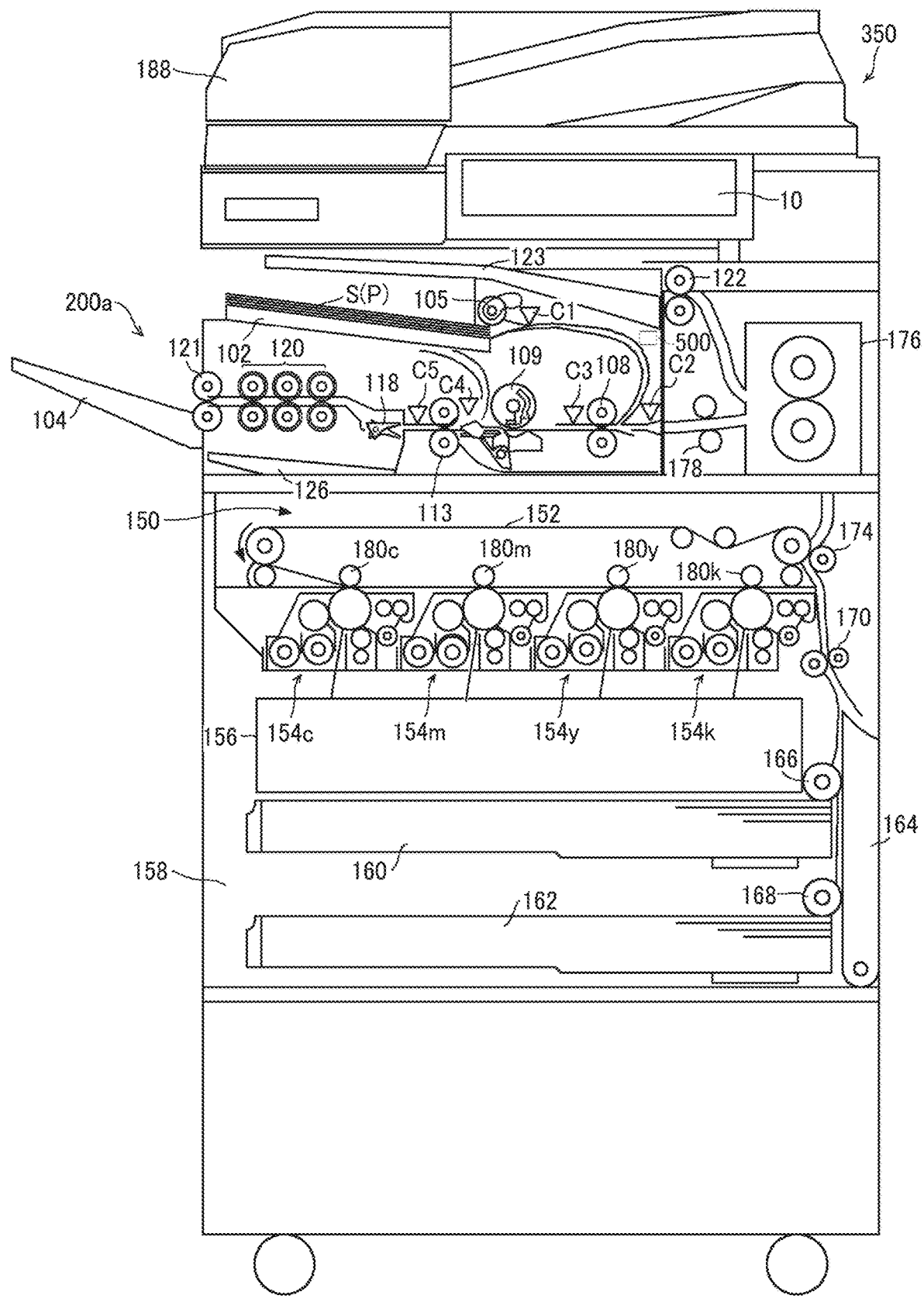
FIG. 19 is a schematic diagram illustrating an overall configuration of a modification of the image forming apparatus including the laminator illustrated in FIG. 18.

FIG. 19 is a diagram illustrating a modification example of the image forming apparatus including the laminator illustrated in FIG. 18. An image forming apparatus 350 illustrated in FIG. 19 is basically the same as the image forming apparatus 300 illustrated in FIG. 18. However, the image forming apparatus 350 is different from the image forming apparatus 300 illustrated in FIG. 18 in that image forming apparatus 350 includes a main-unit ejection roller pair 122 and a main-unit ejection tray 123, each of which is provided in a main unit of the image forming apparatus 350.

When lamination processing is not performed, the image forming apparatus 350 can eject a recording medium on which an image has been formed, by the main-unit ejection roller pair 122 to the main-unit ejection tray 123. Accordingly, the image forming apparatus 350 does not decrease the image output speed when the lamination processing is not performed.

Note that the image forming apparatus 350 may include the laminator 200a inside the main body such that the laminator 200a is detachably attached to the main body. That is, when the lamination processing is not required, the laminator 200a may be detached from the image forming apparatus 350.

In addition, in the laminator 200a thus detached, the sheet feed tray 103 on which an inner sheet P is stacked and the pickup roller 106 to feed the inner sheet P from the sheet feed tray 103 may be attached to the laminator 200a, so that the laminator 200a is used as a stand-alone machine similar to the laminator 200a illustrated in FIG. 1.

Each of the image forming apparatus 300 illustrated in FIG. 18 and the image forming apparatus 350 illustrated in FIG. 19 may include a sheet processing apparatus instead of the laminator. The image forming apparatus 350 illustrated in FIG. 19 may include the sheet processing apparatus 100 that is detachably attached to a main unit of the image forming apparatus 350. The configuration in which the sheet processing apparatus is detachably attachable can enhance the convenience for the user.

Further, an image forming system may include the image forming apparatus 300 or 350, the sheet processing apparatus 100 detachably attached to the image forming apparatus 300 or 350 or the laminator 200 detachably attached to the image forming apparatus 300 or 350. In some embodiments, an image forming system may include at least one of a sheet feeder (a stacker) and a case binding device. Note that, in a case in which the lamination sheet S passes through the fixing device 176, the lamination sheet S is not bonded at the fixing temperature but is bonded by application of heat higher than the fixing temperature.

Although the image forming apparatuses 300 and 350 employ electrophotography for image formation on a lamination sheet S and an inner sheet in the description above, the image formation method is not limited thereto, and inkjet, stencil printing, or other printing method can be used.

The image forming apparatus 300 according to an embodiment of the present disclosure includes the above-described sheet processing apparatus 100 and an image forming device that forms an image. That is, the sheet processing apparatus 100 may be incorporated in an image forming apparatus.

Figure 20:
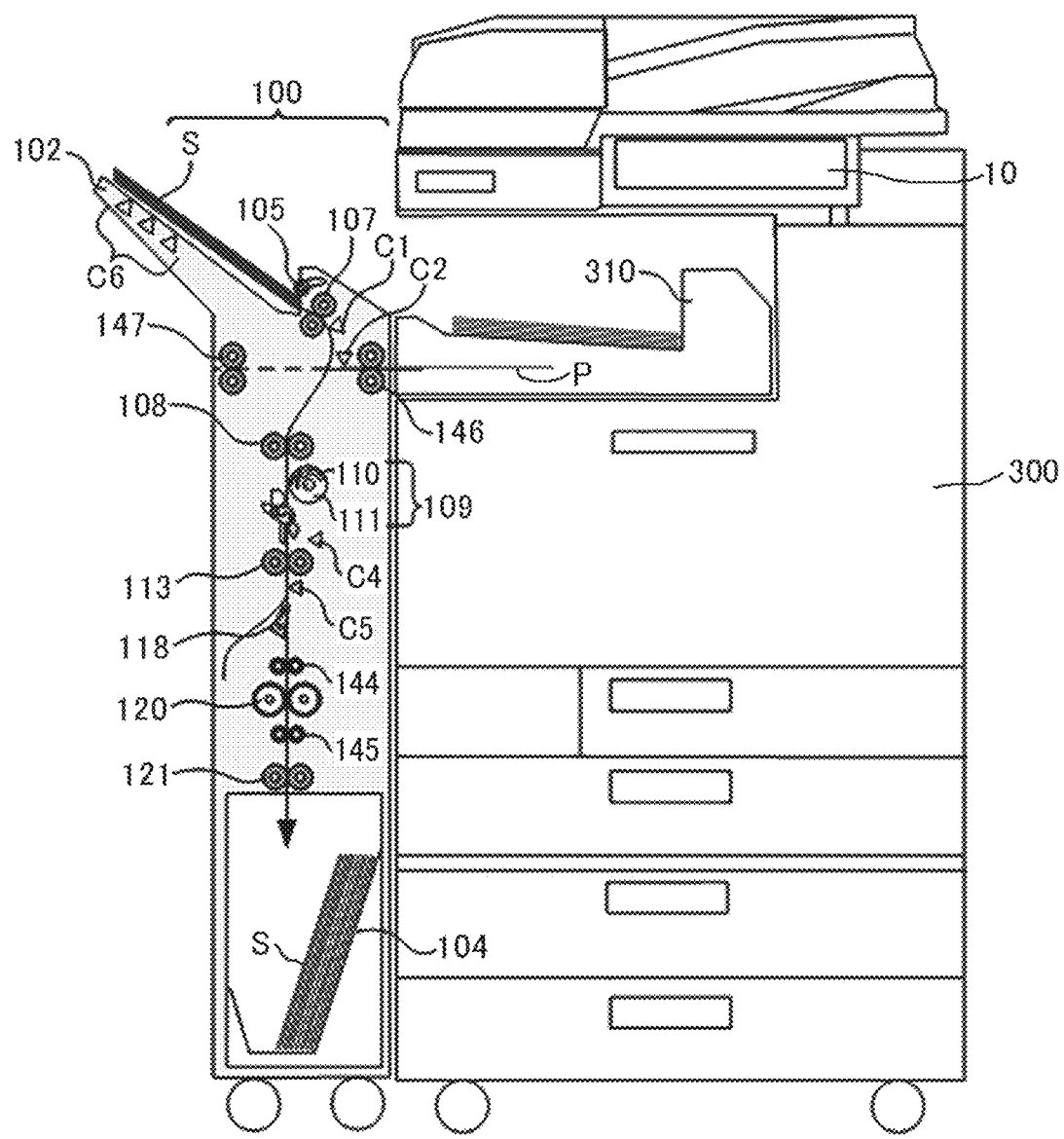
FIG. 20 is a schematic view of an image forming apparatus according to an embodiment of the present disclosure.

FIG. 20 is a schematic view of an image forming apparatus according to an embodiment of the present disclosure.

The image forming apparatus 300 includes the sheet processing apparatus 100 or the laminator 200 on the outside (side surface) of the image forming apparatus 300. In the following description, parts having similar functions to those of the parts of the above-described apparatus or device are given the same reference numerals as the reference numerals given to the identical or corresponding parts of the above-described apparatus. Redundant description of these parts is omitted as appropriate. The sheet processing apparatus 100 or the laminator 200 includes the sheet tray 102 that stacks lamination sheets S. An inner sheet P can be fed from a sheet feeding unit 310 of the image forming apparatus 300. A desired image is printed on the inner sheet P to be inserted into the lamination sheet S by a method utilizing copying or printing of the image forming apparatus 300, and the inner sheet P is insertable in an in-line manner.

In the sheet processing apparatus 100, a plurality of sensors C1 to C6 that detect the size of a lamination sheet S are arranged on the sheet tray 102, and conveying rollers 144 and 145 are disposed upstream and downstream from the heat pressing roller 120 in the sheet conveyance direction.

Figure 21:
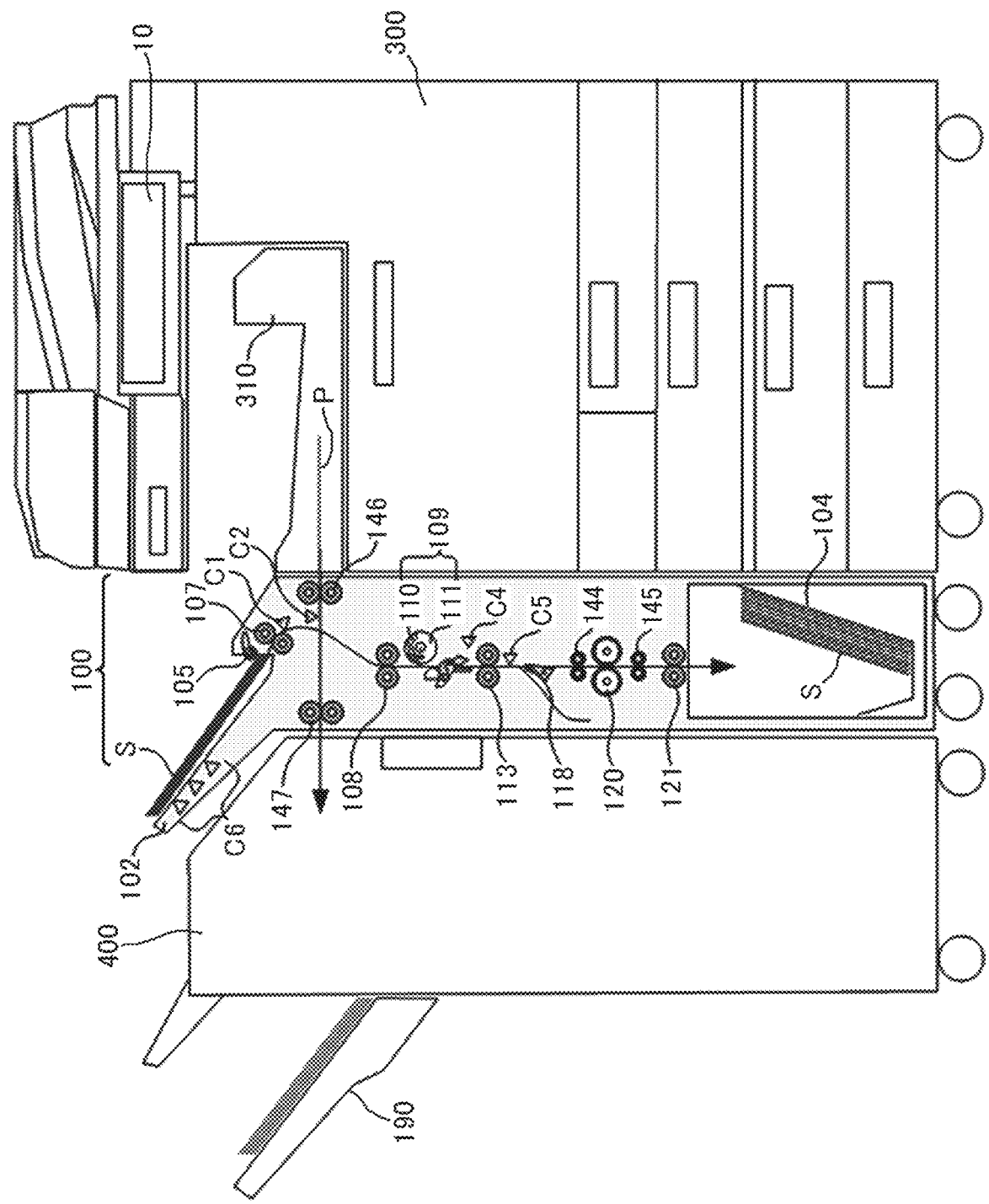
FIG. 21 is a schematic diagram illustrating a configuration of an image forming system including an image forming apparatus, a relay device, a sheet processing apparatus (or a laminator), and a post-processing apparatus, according to an embodiment of the present disclosure.

FIG. 21 is a schematic diagram illustrating a configuration of an image forming system including the image forming apparatus 300, the relay device 310, the sheet processing apparatus 100 (or the laminator 200), and a post-processing apparatus 400.

The image forming system according to the present embodiment can feed an inner sheet P from the image forming apparatus 300 via the relay device 310. The post-processing apparatus 400 serving as a post-processing apparatus other than the sheet processing apparatus 100 is disposed downstream from the image forming apparatus 300. Thus, the user can use the image forming system without reducing the efficiency of print jobs in which the lamination processing is not performed.

In the case of a print job in which lamination processing is not performed, the inner sheet P fed from the image forming apparatus 300 is received by entrance rollers 146 of the sheet processing apparatus 100 and conveyed to the post-processing apparatus 400 by ejection rollers 147. The post-processing apparatus 400 is located downstream from the sheet processing apparatus 100 in the sheet conveyance direction, and the ejection rollers 147 is located downstream from the entrance rollers 146 in the sheet conveyance direction. The post-processing apparatus 400 can perform post-processing such as staple processing on a sheet material that has not been subjected to lamination processing. The inner sheets P are stacked on a sheet ejection tray 190 of the post-processing apparatus 400.

In the sheet processing apparatus 100, a plurality of sensors C1 to C6 that detect the size of a lamination sheet S are arranged on the sheet tray 102, and conveying rollers 144 and 145 are disposed upstream and downstream from the heat pressing roller 120 in the sheet conveyance direction.

FIG. 22 is a diagram illustrating an operation panel 10 that is an operation device to set the thickness of a lamination film S, which is an example of the lamination sheet S, and the thickness of an inner sheet P. The operation panel 10 is mounted on the sheet processing apparatus 100, the image forming apparatus 300, or the image forming system. The operation panel 10 serving as an operation device is an information acquisition device that acquires information on the lamination film S and the inner sheet P. The user can input the thicknesses of the lamination film S and the inner sheet P through the operation panel 10. A controller 500 in the sheet processing apparatus 100 sets the fixing temperature of the heat pressing rollers 120 in accordance with the acquired information on the lamination film S and the inner sheet P. The controller 500 includes, for example, a central processing unit (CPU), a read only memory (ROM), and a random access memory (RAM) in order to control operations of the sheet processing apparatus 100.

The user selects, from the operation panel 10, the thickness of the lamination film S to be used for lamination processing and the thickness of the inner sheet P to be sandwiched between lamination films S and presses a lamination-processing execution key to start the lamination processing. In FIG. 22, a thick-film mode is set as a lamination-film thickness setting, and a thin-sheet mode is set as an inner-sheet thickness setting.

In FIG. 22, the operation panel is illustrated as an example. However, the lamination processing may be executed by using, for example, a switch.

FIG. 23 is a diagram illustrating an example of the fixing temperature when the thickness of a lamination film and the thickness of an inner sheet are set.

The lamination-film thickness setting includes a thin-film mode (60 μm to 90 μm), a normal-film mode (90 μm to 120 μm), and a thick-film mode (120 μm to 150 μm). The inner-sheet thickness setting includes a thin-sheet mode (50 g/m$^2$ to 64 g/m$^2$), a plain-sheet mode (64 g/m$^2$ to 80 g/m$^2$), and a thick-sheet mode (80 g/m$^2$ to 105 g/m$^2$). In the thin-film mode, the fixing temperature increases as the thickness of the inner sheet P increases (low-temperature fixing 1 to 3). In the normal-film mode, the fixing temperature increases as the thickness of the inner sheet P increases (middle-temperature fixing 1 to 3). In the thick-film mode, the fixing temperature increases as the thickness of the inner sheet P increases (high-temperature fixing 1 to 3). That is, the fixing temperature increases as the thickness of the lamination film S and the thickness of the inner sheet P increase.

Figure 24:
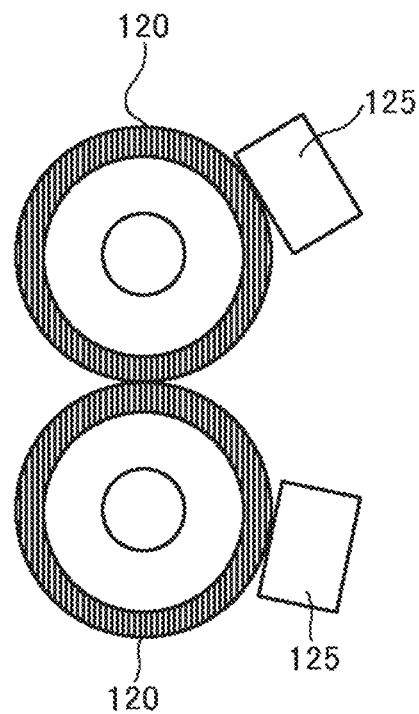
FIG. 24 is a schematic view of a temperature detector that detects the temperature of heat pressing rollers.

FIG. 24 is a schematic view of a temperature detector that detects the temperature of the heat pressing rollers 120, according to an embodiment of the present disclosure.

As illustrated in FIG. 24, the sheet processing apparatus 100 includes thermistors 125 as a temperature detector that detects the temperature of each of the heat pressing rollers 120. The thermistor 125 can detect whether the temperature of the heat pressing roller 120 has risen or fallen to the fixing temperature.

Although the thermistor 125 is illustrated in this example, for example, a thermocouple may be used instead of the thermistor 125 to detect the temperature of the heat pressing roller 120.

Figure 25B:
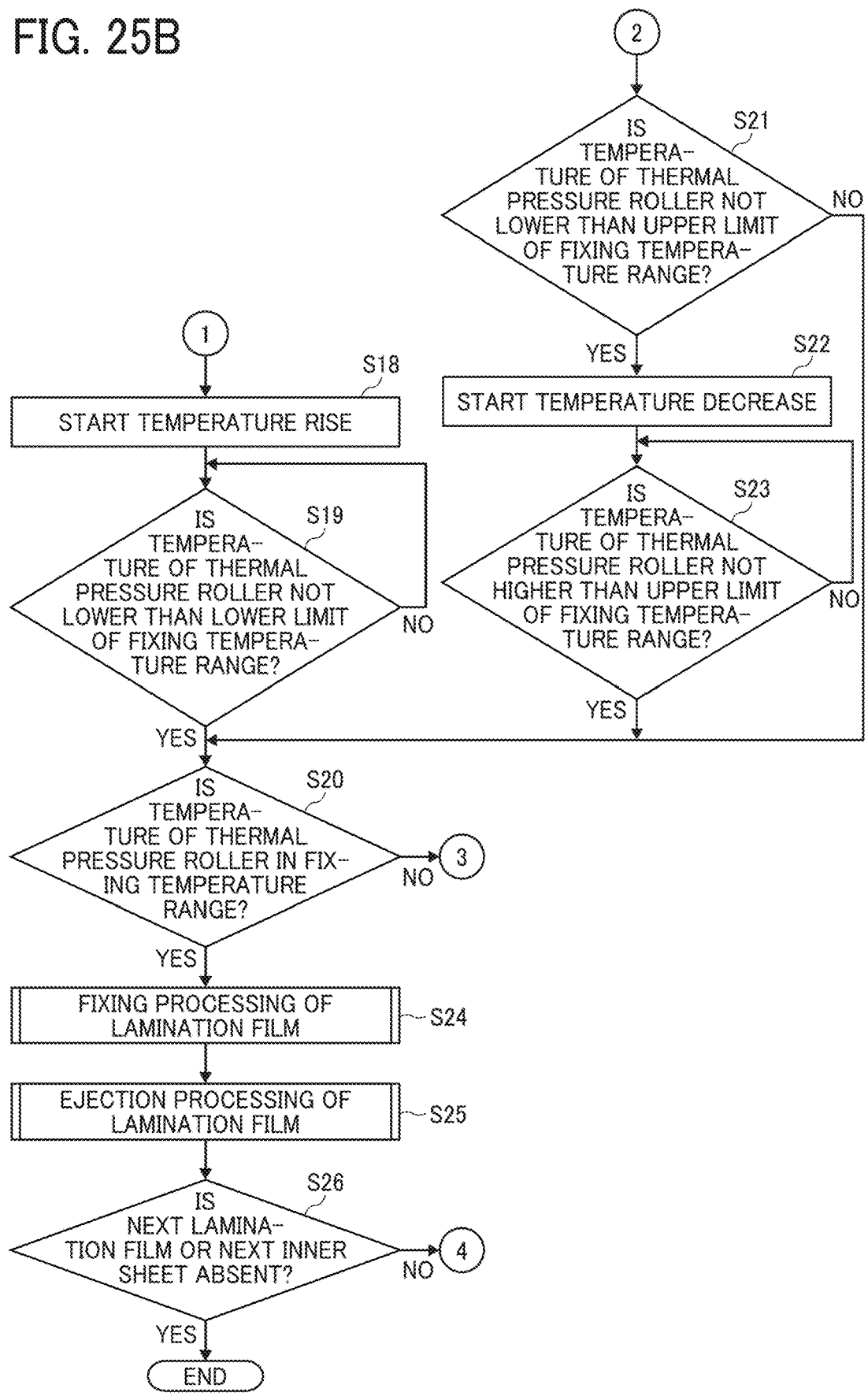

FIG. 25 including FIGS. 25A and 25B is a flowchart illustrating a series of operations from feeding of a lamination film to the end of ejection of the lamination film.

The user sets the thickness (film thickness) of the lamination film S and the thickness (sheet thickness) of the inner sheet P by using, for example, the operation panel 10 of the sheet processing apparatus 100 before the start of sheet feeding (step S10), and determines the fixing temperature of the heat pressing rollers 120 (step S11). Next, when the user presses a start key (lamination-processing execution key) on the operation panel 10 or the like (YES in step S12), the sheet processing apparatus 100 starts feeding the lamination film S based on a signal from the controller 500 (step S13) and performs separation processing on the lamination film S (step S14, see FIGS. 2 to 9). Next, the sheet processing apparatus 100 starts feeding the inner sheet P (step S15) and performs an insertion processing of the inner sheet P (step S16, see FIGS. 10 to 12, 15, and 16).

Next, the sheet processing apparatus 100 waits until the fixing temperature of the heat pressing rollers 120 reaches the appropriate temperature (see FIG. 23) for the set thicknesses of the lamination film S and the inner sheet P. That is, when the temperature of the heat pressing roller 120 detected by the thermistor 125 is equal to or lower than the lower limit of the fixing temperature range (YES in step S17), the sheet processing apparatus 100 starts increasing the temperature of the heat pressing roller 120 (step S18) and waits until the temperature of the heat pressing roller 120 is equal to or higher than the lower limit of the fixing temperature range (YES in step S19) and falls within a predetermined fixing temperature range (YES in step S20). Alternatively, when the temperature of the heat pressing roller 120 is higher than the lower limit of the fixing temperature range (NO in step S17) and higher than or equal to the upper limit of the fixing temperature range (YES in step S21), the sheet processing apparatus 100 starts lowering the temperature of the heat pressing roller 120 (step S22) and waits until the temperature of the heat pressing roller 120 is lower than or equal to the upper limit of the fixing temperature range (YES in step S23) and falls within the predetermined fixing temperature range (YES in step S20). When the temperature of the heat pressing roller 120 is lower than the upper limit of the fixing temperature range (NO in step S21), the sheet processing apparatus 100 waits until the temperature of the heat pressing roller 120 falls within the predetermined fixing temperature range (YES in step S20).

When the temperature of the fixing unit reaches an appropriate temperature for the set thicknesses of the lamination film S and the inner sheet P, the sheet processing apparatus 100 conveys the lamination film S to the fixing unit based on a signal from the controller 500, and performs fixing processing (step S24, see FIG. 13) and ejection processing (step S25, see FIG. 14) of the lamination film S.

After the end of the sheet ejection, the sheet processing apparatus 100 checks the presence or absence of the next lamination film S or the next inner sheet P. If the next lamination film S or the next inner sheet P is present (NO in step S26), the lamination film S and the inner sheet P are fed again (step S13 and subsequent steps), and the process is repeated until the next lamination film S or the next inner sheet P disappears. When there is no next lamination film S or next inner sheet P, the job is ended (YES in step S26).

Figure 26A:
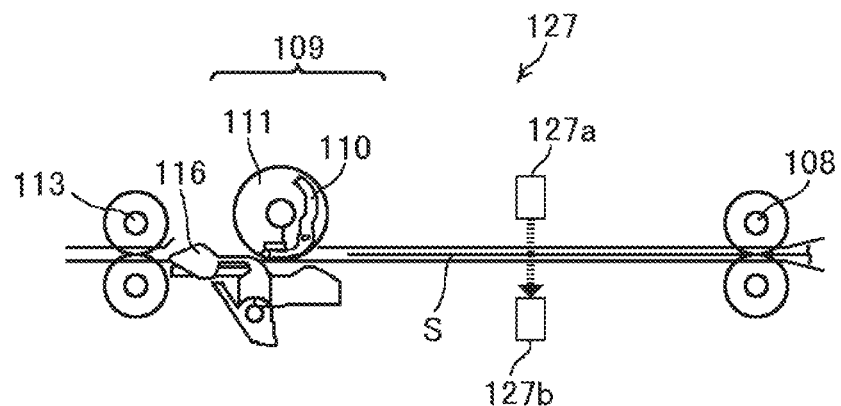
FIGS. 26A and 26B are schematic views of an ultrasonic sensor serving as a thickness detector that detects the film thickness of a lamination film.
Figure 26B:
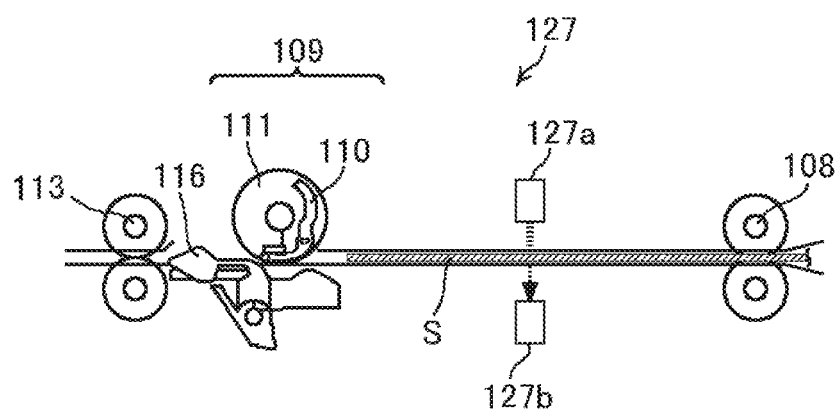

FIGS. 26A and 26B are schematic views illustrating an ultrasonic sensor 127 that is a thickness detector to detect the thickness of a lamination film. The thickness detector is an example of an information acquisition device that acquires information on a lamination film S.

As illustrated in FIGS. 26A and 26B, the ultrasonic sensor 127 includes a transmitter 127a and a receiver 127b that are disposed on both sides of a conveyance path between the entrance roller pair 108 and the winding roller 109. Ultrasonic waves transmitted from the transmitter 127a pass through the lamination film S and reach the receiver 127b. At this time, the attenuation amount (rate) of the ultrasonic wave reaching the receiver 127b is detected, thus allowing the thickness of the lamination film S to be determined. In FIG. 26A, since the lamination film S is thin, the attenuation amount (rate) of the ultrasonic wave is small. In FIG. 26B, since the lamination film S is thick, the attenuation amount (rate) of the ultrasonic wave is large.

FIGS. 27A and 27B are schematic views illustrating an ultrasonic sensor 127 that is a thickness detector to detect the thickness of an inner sheet. The thickness detector is an example of an information acquisition device that acquires information on an inner sheet P.

As illustrated in FIGS. 27A and 27B, the ultrasonic sensor 127 includes a transmitter 127a and a receiver 127b that are disposed on both sides of a conveyance path between the entrance roller pair 108 and the winding roller 109. An ultrasonic wave transmitted from the transmitter 127a reaches the receiver 127b through the inner sheet P. At this time, detecting the attenuation amount (rate) of the ultrasonic wave reaching the receiver 127b allows the thickness of the inner sheet P to be determined. In FIG. 27A, since the inner sheet P is thin, the attenuation amount (rate) of the ultrasonic wave is small. In FIG. 27B, since the inner sheet P is thick, the attenuation amount (rate) of the ultrasonic wave is large.

The ultrasonic sensor 127 that is a thickness detector to detect the thickness of a lamination film and the thickness of an inner sheet may be provided in addition to the operation panel 10 to which the user can input the thicknesses of the lamination film and the inner sheet.

FIGS. 28A and 28B are schematic views of another thickness detection mechanism to detect the thickness of a lamination film and the thickness of an inner sheet. FIG. 29 is a schematic diagram illustrating an encoder pulse output by an encoder.

As illustrated in FIG. 28A, as another thickness detection mechanism, a sheet-thickness detection lever 181 is disposed in contact with a shaft 108a of the entrance roller pair 108, and an encoder 182 is connected to the sheet-thickness detection lever 181. As illustrated in FIG. 28B, when a lamination film S or an inner sheet P passes through the entrance roller pair 108, the sheet-thickness detection lever 181 moves as the entrance roller pair 108 is separated by the thickness of the lamination film S or the inner sheet P. Then, as illustrated in FIG. 29, an encoder pulse is output by the encoder 182. Reading the encoder pulse allows the thickness of the lamination film S and the thickness of the inner sheet P to be detected.

Figure 30A:
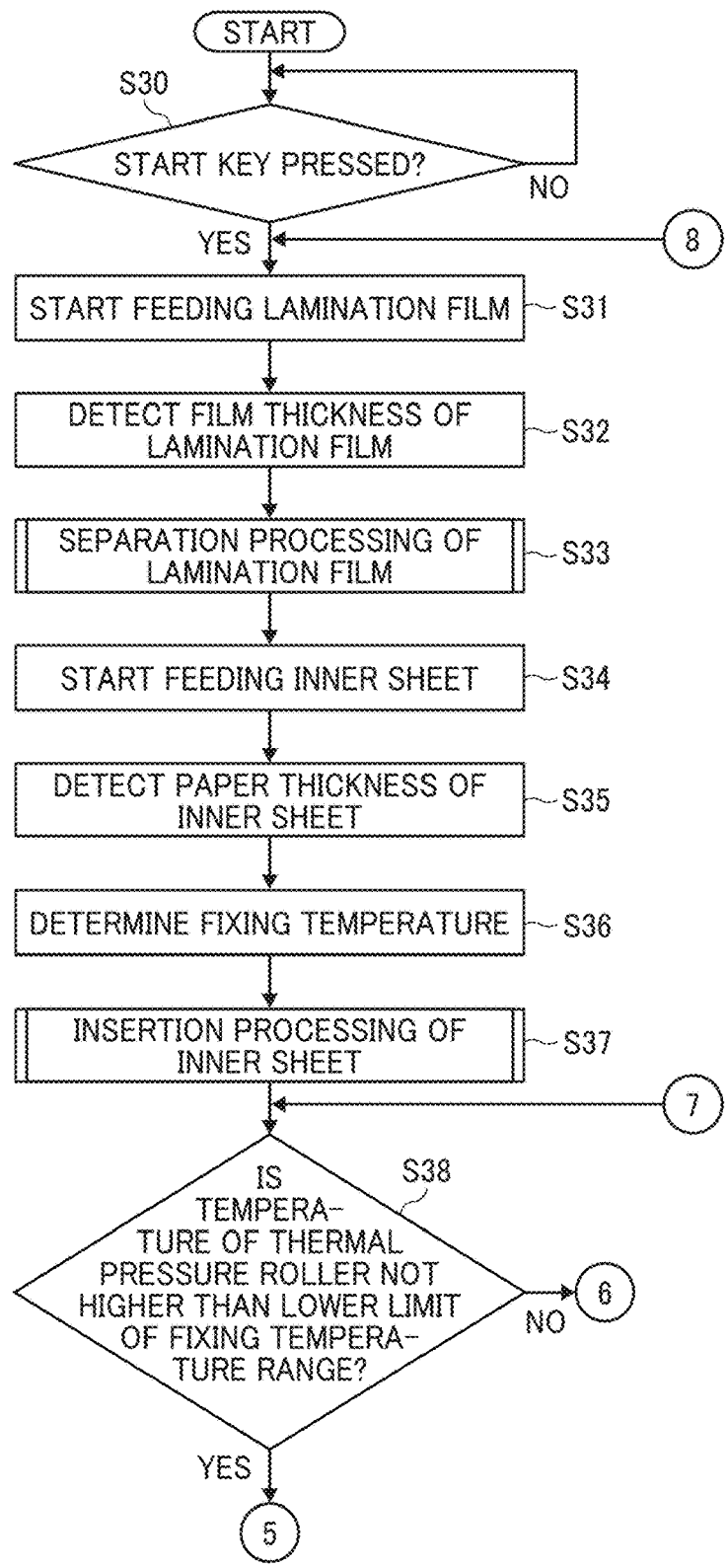
FIGS. 30A and 30B is a flowchart of another series of operations from feeding of a lamination film to completion of ejection of the lamination film.
Figure 30B:
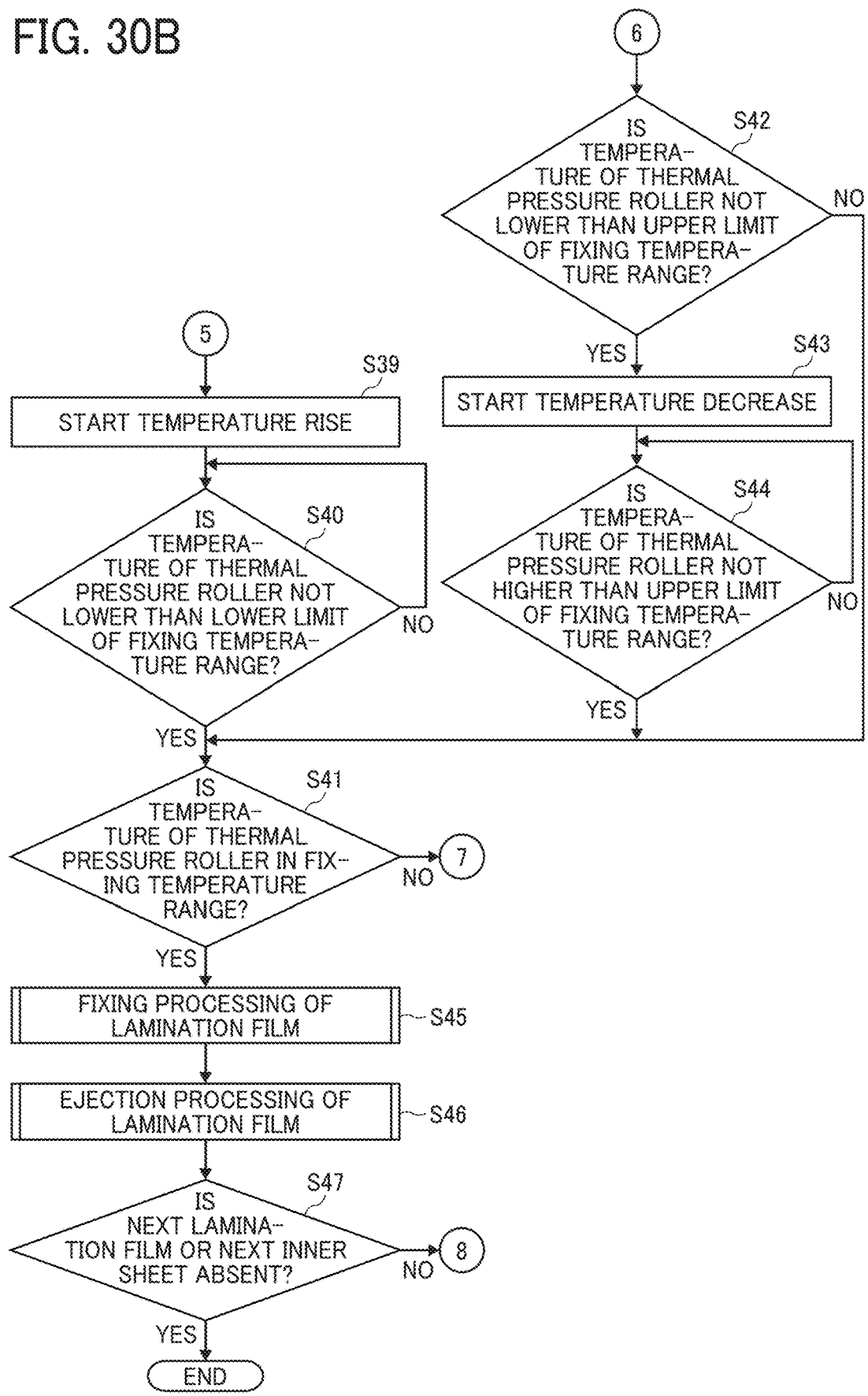

FIG. 30 including FIGS. 30A and 30B is a flowchart illustrating a series of operations from the feeding of the lamination film to the end of the sheet ejection when the thickness of a lamination film and the thickness of an inner sheet are detected by using a detection mechanism.

The user does not set the thickness of the lamination film S and the thickness of the inner sheet P on the operation panel 10 or the like of the sheet processing apparatus 100 before the start of sheet feeding. The thickness of the lamination film S and the thickness of the inner sheet P are detected during conveyance after the start of sheet feeding. First, when the user presses a start key (lamination-processing execution key) on the operation panel 10 or the like (YES in step S30) to start feeding the lamination film S (step S31), the sheet processing apparatus 100 detects the thickness of the lamination film S with the thickness detection mechanism based on a signal from the controller 500 (step S32). Next, the sheet processing apparatus 100 performs separation processing of the lamination film S (step S33, see FIGS. 2 to 9). Next, the sheet processing apparatus 100 starts feeding the inner sheet P (step S34) and detects the thickness of the inner sheet P by the thickness detection mechanism (step S35). The fixing temperature is determined from the acquired thicknesses of the lamination film S and the inner sheet P (step S36). Next, the sheet processing apparatus 100 performs insertion processing of an inner sheet (step S37, see FIGS. 10 to 12, 15, and 16).

Next, the sheet processing apparatus 100 waits until the fixing temperature of the heat pressing roller 120 reaches an appropriate temperature (see FIG. 23) for the detected thicknesses of the lamination film S and the inner sheet P. That is, when the temperature of the heat pressing roller 120 detected by the thermistor 125 is equal to or lower than the lower limit of the fixing temperature range (YES in step S38), the sheet processing apparatus 100 starts increasing the temperature of the heat pressing roller 120 (step S39) and waits until the temperature of the heat pressing roller 120 is equal to or higher than the lower limit of the fixing temperature range (YES in step S40) and falls within a predetermined fixing temperature range (YES in step S41). Alternatively, when the temperature of the heat pressing roller 120 is higher than the lower limit of the fixing temperature range (NO in step S38) and higher than or equal to the upper limit of the fixing temperature range (YES in step S42), the sheet processing apparatus 100 starts lowering the temperature of the heat pressing roller 120 (step S43) and waits until the temperature of the heat pressing roller 120 is lower than or equal to the upper limit of the fixing temperature range (YES in step S44) and falls within the predetermined fixing temperature range (YES in step S41). When the temperature of the heat pressing roller 120 is lower than the upper limit of the fixing temperature range (NO in step S42), the sheet processing apparatus 100 waits until the temperature of the heat pressing roller 120 falls within the predetermined fixing temperature range (YES in step S41).

When the temperature of the fixing unit reaches an appropriate temperature for the detected thicknesses of the lamination film S and the inner sheet P, the sheet processing apparatus 100 conveys the lamination film S to the fixing unit based on a signal from the controller 500, and performs fixing processing (step S45, see FIG. 13) and ejection processing (step S46, see FIG. 14) of the lamination film S.

After the end of the sheet ejection, the sheet processing apparatus 100 checks the presence or absence of the next lamination film S or the next inner sheet P. If the next lamination film S or the next inner sheet P is present (NO in step S47), the lamination film S and the inner sheet P are fed again (step S31 and subsequent steps), and the process is repeated until the next lamination film S or the next inner sheet P disappears. When there is no next lamination film S or next inner sheet P, the job is ended (YES in step S47).

The pouch lamination has been described in the present embodiment. In some embodiments, for example, roll lamination may be used.

The above-described embodiments are illustrative and do not limit the present disclosure. Thus, numerous additional modifications and variations are possible in light of the above teachings. For example, elements and features of different illustrative embodiments may be combined with each other and substituted for each other within the scope of the present disclosure.

Any one of the above-described operations may be performed in various other ways, for example, in an order different from the one described above.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), digital signal processor (DSP), field programmable gate array (FPGA), and conventional circuit components arranged to perform the recited functions.

What is claimed is:

1. A sheet processing apparatus for laminating two sheets and a sheet medium inserted in the two sheets, the sheet processing apparatus comprising:

a heat presser configured to heat and press the two sheets into which the sheet medium is inserted;
an information acquisition device configured to acquire information on the two sheets and the sheet medium; and
control circuitry configured to set a fixing temperature of the heat presser in accordance with the information of the two sheets and the sheet medium acquired by the information acquisition device,
wherein
the fixing temperature is a temperature range,
the temperature range of the fixing temperature having different upper limits and lower limits based on a thickness of the two sheets, and
the temperature range of the fixing temperature includes sub-ranges based on a thickness of the sheet medium.

2. The sheet processing apparatus according to claim 1,
wherein the information acquisition device includes an operation device configured to input the thickness of the two sheets and the thickness of the sheet medium, and
wherein the information includes the thickness of the two sheets and the thickness of the sheet medium.

3. The sheet processing apparatus according to claim 1,
wherein the information acquisition device includes a thickness detector configured to detect the thickness of the two sheets and the thickness of the sheet medium, and
wherein the control circuitry is configured to acquire information on the thickness of the two sheets and the thickness of the sheet medium with the thickness detector.

4. The sheet processing apparatus according to claim 1, further comprising an inserter configured to insert the sheet medium into the two sheets.

5. The sheet processing apparatus according to claim 1, further comprising a temperature detector configured to detect a temperature of the heat presser,
wherein the control circuitry is configured to not perform lamination processing until the temperature of the heat presser detected by the temperature detector falls within a predetermined fixing temperature range.

6. An image forming apparatus comprising:
the sheet processing apparatus according to claim 1; and
an image forming device configured to form an image.

7. The image forming apparatus according to claim 6,
wherein the sheet processing apparatus is attachable to and detachable from a main unit of the image forming apparatus.

8. The image forming apparatus according to claim 6,
wherein the information acquisition device is configured to acquire the information on the two sheets and the sheet medium from a main unit of the image forming apparatus.

9. An image forming system comprising the sheet processing apparatus according to claim 1.

10. A sheet processing apparatus for laminating two sheets and a sheet medium inserted in two sheets, the sheet processing apparatus comprising:
an inserter configured to insert the sheet medium into the two sheets;
a heat presser configured to heat and press the two sheets into which the sheet medium is inserted;
a temperature detector configured to detect a temperature of the heat presser;
an information acquisition device configured to acquire information on the two sheets and the sheet medium; and
control circuitry configured to
set a fixing temperature of the heat presser in accordance with the information of the two sheets and the sheet medium acquired by the information acquisition device,
cause the heat presser to wait until the temperature of the heat presser detected by the temperature detector falls within a proper fixing temperature range after the sheet medium is inserted into the two sheets by the inserter; and
cause the heat presser to start heating and pressing the two sheets into which the sheet medium is inserted, when the temperature of the heat presser detected by the temperature detector reaches a proper temperature.

* * * * *